US010201123B2

(12) United States Patent
Peter

(10) Patent No.: US 10,201,123 B2
(45) Date of Patent: Feb. 12, 2019

(54) SEED FIRMER LIFE EXTENDER MOUNTING BRACKET AND FASTENER

(71) Applicant: Flo-Rite, Inc., Hicksville, OH (US)

(72) Inventor: Jeffrey J Peter, Hicksville, OH (US)

(73) Assignee: Flo-Rite, Inc., Hicksville, OH (US)

( * ) Notice: Subject to any disclaimer, the term of this patent is extended or adjusted under 35 U.S.C. 154(b) by 112 days.

(21) Appl. No.: 15/405,923

(22) Filed: Jan. 13, 2017

(65) Prior Publication Data

US 2017/0295718 A1    Oct. 19, 2017

Related U.S. Application Data

(63) Continuation-in-part of application No. PCT/US2016/066214, filed on Dec. 12, 2016, and a continuation-in-part of application No. 14/627,096, filed on Feb. 20, 2015, now Pat. No. 9,908,222, and a continuation-in-part of application No. 14/012,246, filed on Nov. 4, 2013, now Pat. No. 9,565,797, which is a continuation-in-part of application No. 13/862,698, filed on Apr. 15, 2013, now abandoned.

(60) Provisional application No. 62/278,081, filed on Jan. 13, 2016, provisional application No. 62/312,221, filed on Mar. 23, 2016, provisional application No. 61/942,225, filed on Feb. 20, 2014, provisional application No. 62/018,173, filed on Jun. 27, 2014, provisional application No. 61/642,004, filed on May 3, 2012.

(51) Int. Cl.
*A01C 5/06* (2006.01)
*A01C 7/20* (2006.01)
*A01C 7/06* (2006.01)
*A01C 23/02* (2006.01)
*F16M 13/02* (2006.01)

(52) U.S. Cl.
CPC ............... *A01C 7/20* (2013.01); *A01C 5/068* (2013.01); *A01C 7/06* (2013.01); *A01C 23/023* (2013.01); *F16M 13/02* (2013.01)

(58) Field of Classification Search
CPC ........... B25B 27/02; A01C 5/068; A01C 7/20
USPC ........................................................ 29/270
See application file for complete search history.

(56) References Cited

U.S. PATENT DOCUMENTS

| 1,024,208 A | | 4/1912 | Langley | |
|---|---|---|---|---|
| 1,064,400 A | * | 6/1913 | Timmins | B25B 27/023 |
| | | | | 29/259 |
| 1,447,768 A | * | 3/1923 | Dover | B25B 27/023 |
| | | | | 29/261 |

(Continued)

OTHER PUBLICATIONS

Patent Cooperation Treaty, PCT International Search Report, dated Jun. 1, 2017 (PCT/US2016/066214).

*Primary Examiner* — George Nguyen
(74) *Attorney, Agent, or Firm* — Kevin R. Erdman; Brannon Sowers & Cracraft PC

(57) ABSTRACT

The present invention involves a seed firmer with a pusher attachment that extends the life of the seed firmer and improved brackets for mounting the same to a planter. The improved brackets allow for different mechanisms of mounting seed firmers to different locations on a planter. The brackets have portions for attaching and mounting to the planter, and a housing for accepting and securing the firmers. The brackets allow for better positioning of firmers on a planter, ease of mounting and/or replacement of firmers, and improved firmer functionality.

16 Claims, 26 Drawing Sheets

(56) References Cited

U.S. PATENT DOCUMENTS

| | | | | |
|---|---|---|---|---|
| 4,274,189 | A * | 6/1981 | Conover | B25B 27/062 |
| | | | | 29/256 |
| 6,082,275 | A | 7/2000 | Schaffert | |
| 6,266,861 | B1 * | 7/2001 | Chen | B25B 27/064 |
| | | | | 29/252 |
| 8,517,365 | B2 * | 8/2013 | Velez | B25B 5/147 |
| | | | | 269/140 |
| 8,528,888 | B2 * | 9/2013 | Header | E04D 13/10 |
| | | | | 269/91 |
| 8,910,928 | B2 * | 12/2014 | Header | E04D 13/10 |
| | | | | 269/91 |
| 9,565,797 | B2 * | 2/2017 | Peter | A01C 7/08 |
| 2012/0255474 | A1 | 10/2012 | Sauder et al. | |

\* cited by examiner

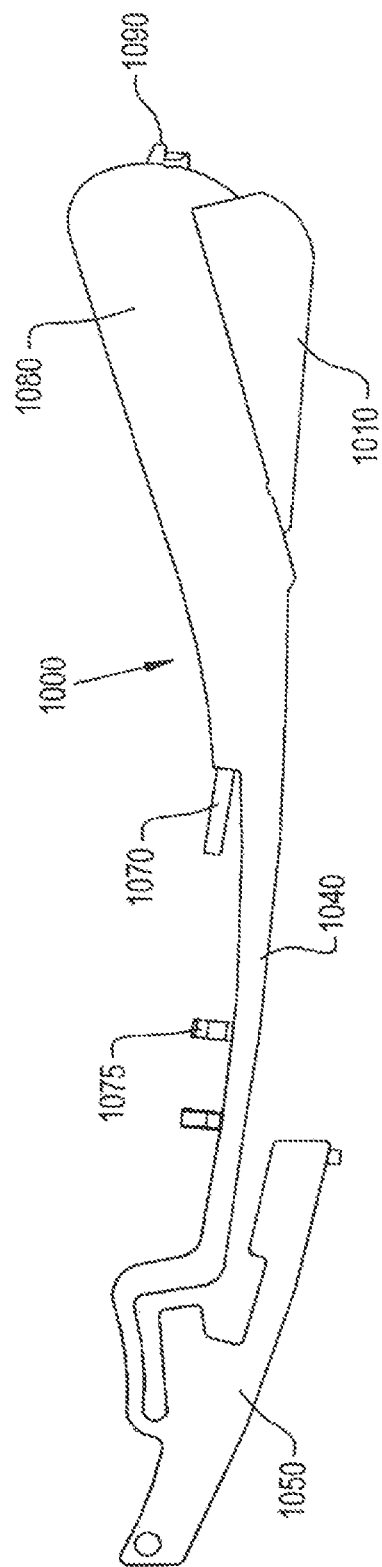

SEED FIRMER LIFE EXTENDER MOUNTING BRACKET AND FASTENER

CROSS-REFERENCE TO RELATED APPLICATIONS

The present application claims priority under 35 U.S.C. § 119(e) U.S. Patent Provisional Application Ser. No. 62/278,081 filed Jan. 13, 2016; to U.S. Patent Provisional Application Ser. No. 62/312,221 filed Mar. 23, 2016; is a continuation-in-part of co-pending U.S. patent application Ser. No. 14/627,096, filed Feb. 20, 2015 which claims priority to U.S. Patent Provisional Application Ser. No. 61/942,225, filed Feb. 20, 2014 to U.S. Patent Provisional Application Ser. No. 62/018,173, filed Jun. 27, 2014, and is a continuation-in-part of co-pending U.S. patent application Ser. No. 14/012,246, filed Nov. 4, 2013, which is a continuation-in-part of U.S. patent application Ser. No. 13/862,698, filed Apr. 15, 2013 (abandoned), which claims priority to U.S. Patent Provisional Application Ser. No. 61/642,004 filed May 3, 2012; and to PCT/US2016/066214, filed Dec. 12, 2016, the disclosures of which are incorporated by reference herein.

BACKGROUND

Field of the Invention

The invention relates to agricultural planting implements. More specifically, the field of the invention is that of seed tuners and brackets for mounting them to planters.

Description of the Related Art

Seed firmers are known and used extensively in agricultural planting systems. Such farmers add to the expense of a planting implement but are thought to more than pay for themselves in terms of increased yield. U.S. Pat. No. 5,425,318 describes one type of seed firmer; U.S. Pat. Nos. 5,730,074, 5,852,982, 6,082,274, and 6,220,191 describe seed firmers having liquid dispensing arrangements; and U.S. Pat. No. 7,497,174 describes a mounting system for seed firmers. Complicated mounting systems and bracket devices are used to mount the timers on planters for use during the planting season, typically attached to the seed chute. Improvements in the cost and performance of the firmer and mounting systems are always welcomed.

SUMMARY

The present invention involves a seed firmer construction which provides a replaceable tip or end for extending the life of the firmer, and a bracket for mounting the seed firmer. The seed firmer generally has two components that degrade with use, the flexible aim and the embedding pusher. The flexible arm generally lasts much longer than the embedding pusher portion because the pusher wears against the ground and eventually wears away. Embodiments of the invention include an embedding pusher portion that has a stop and a guide for accepting a replaceable extender. Other embodiments include an embedding pusher portion that engages the rest of the firmer arm. Thus, the portion of the firmer that wears down may be easily replaced which extends the life of the firmer, multiple times over the useful life of the flexible arm. The mounting bracket is for attaching the seed firmer to a planter with a mounting portion adapted to mount the bracket to an existing attachment point on a planter tool arm. The mounting bracket also has a housing portion adapted to receive the flexible portion of a seed firmer, with an opening for receiving the flexible portion of the seed firmer and a slot for receiving a protrusion on the flexible portion of the seed firmer. The seed firmer is secured to the bracket when the firmer protrusion is engaged with the housing slot such that the mounting portion is positioned on the planter tool arm to allow the firming portion of the firmer to be disposed aft of the planter seed chute and forward of the planter closing wheels.

In one embodiment, the end of the firmer has a slot that is bounded by a stop portion. The embedding pusher attachment slides into the slot and abuts the stop portion. The bottom of the embedding pusher operates in a conventional manner pushing the seed downwardly into the ground to thus embed the seed in the soil. During the usable life of the firmer, the flexible portion may operate on several embedding pusher attachments. In another embodiment, the embedding end is attached to the flexible arm, with the pusher attachment detactably extending from the embedding arm. In further embodiment, the arm of the attachment portion of the firmer has a connecting portion that attaches to a replaceable embedding element.

The embodiments of the firmer of the present invention optionally provide a passageway for fluid to be dispensed proximate the end of the firmer. The end of the passageway includes a directional attachment that directs fluid in relation to the end of the firmer. Other embodiments attach to the planting system either by connection to the seed tube, or connection so a mounting bracket on the planter. A further embodiment includes a delivery tube deployed within the wails of the embedding portion, with the end cap of the tube providing alternative passageways Par the dispensing of liquid.

In one embodiment, the embedding an has a width that expands from the width of about a seed at the bottom to double or triple width at the top. This narrowing of the embedding arm provides sufficient structure to support the constant interaction with the soil as the firmer is pulled through rows of plants. The thicker portion of the embedding arm provides sufficient width for the optional liquid delivery pipe or tube.

Many embodiments include an aperture at the end proximate where the seed is embedded. In one embodiment, a plug is used at that end. The plug may include an overhang to protect the hole from accumulation of debris. In one embodiment, the plug may be drilled to create either a straight backward stream of exiting liquid, while in another embodiment the plug may have two or more holes to create several distinct streams of exiting liquid. Another embodiment has a single plug with a through bore for creating the straight backward stream of exiting liquid, with an additional cap with one or more holes that create other angled streams. The cap may be snap fit or otherwise attached over the plug.

The extender portion of the firmer may attach to the pusher portion of the firmer via a variety of physical and mechanical couplings. For example, a peg in hole coupling, a glue based coupling, and a sonic welded coupling are all possible implementations of the invention. In several embodiments, a tongue and groove arrangement is used to couple the extender and the pusher portions. In one embodiment, the extender has a T shaped projection on the surface interfacing with the pusher portion which has a corresponding T-shaped groove to accept the projection and couple the two pieces together. This allows the extender to slide into the groove until abutting the stop. In one further embodiment, the surfaces h iris the tongue and groove include a further mating bump and depression, arranged so that the engagement of the bump and depression deter further relative movement of the extender and pusher portions. Thus, in several embodiments, the extender may be slid into the groove and snap fit ala precise location.

White the extender is disposed on one end of the firmer, the flexible or pushing portion is disposed at the other end and is adapted to be mounted to the planter in alignment with the seed chute. In one embodiment, the mounting portion of the pushing portion has elements that interfit and complement elements on the seed chute so that the pusher portion is directly aligned with the seed chute. In another embodiment, the pushing portion has a flat mounting end that is configured for engagement with a mounting device for holding a flat flange.

Liquid delivery is provided by a tube and discharge path formed in the firmer. In OM embodiment, the solid firmer has a passageway shaped to receive a pipe, in one embodiment a curved pipe. Once the firmer is first molded, the curved pipe is inserted while the firmer material is setting up. One end of the pipe is attached to a tube, typically a plastic tube, to receive liquid (e.g., water, fertilizer, herbicides, and/or insecticides) from a source. in one embodiment, that first end of the pipe has ridges or is gnarled or otherwise roughened to enhance the connection of the tube. The other side of the pipe faces a discharge area of the firmer. An internal channel leads to a discharge passage. In one embodiment, a central discharge passage is straight hack of the timer. In another embodiment, multiple passages are present to direct liquid discharge at an angle to the body of the firmer. In yet another embodiment, a cap may be placed over the central discharge passage to redirect the discharging liquid in various angles.

Other embodiments of the invention include a firmer defined by a pair of sidewalls. The sidewalls hold the liquid tube proximate the end of the firmer, and attach to the mounting end of the firmer. The extender is detachably connected to the sidewalls, and may thus be replaced when sufficiently worn without having to replace the other portions of the firmer.

In yet another embodiment, the mounting portion of the firmer includes the pushing arm, and the end of the pushing arm attaches to the extender/embedding portion of the firmer. The optional liquid pipe may be included in the extender/embedding portion, or may be optionally coupled to the extender/embedding portion.

The present invention, in one form, relate s to a seed firmer having a flexible portion and an embedding pusher portion. The flexible portion biases the embedding pusher portion into the soil. The embedding pusher portion includes a slot for receiving an embedding pusher attachment, the stop bounded at the end by a stop portion which retains the embedding pusher attachment as it is drawn over the soil.

In other embodiments the present invention relates to mounting brackets usable to mount timers such as those previously described to planters. In one such embodiment a mounting bracket includes a mounting portion designed and configured to secure the bracket to an existing mounting point on a planter tool arm using existing bolts or other hardware. The bracket also includes a firmer securing housing configured to allow insertion of a portion of a firmer therein and capable of securing the firmer to the bracket. The firmer is secured when a protrusion on the firmer engages a corresponding notch or slot in the firmer housing. The firmer may be removed by deforming or flexing the firmer until the protrusion is disengaged from the notch or slot and the firmer may be withdrawn.

In another embodiment, a mounting bracket is secured to a desired location on a planter tool arm using newly created mounting points and/or mounting hardware. The bracket includes a firmer securing housing configured to allow insertion of a portion of a firmer therein and capable of securing the firmer to the bracket. The firmer is secured when a protrusion on the firmer engages a corresponding notch or slot in the firmer housing. The firmer may be removed by deforming or flexing the firmer until the protrusion is disengaged from the notch or slot and he firmer may be withdrawn.

In still another embodiment, a mounting bracket includes a firmer mounting portion having a slotted portion sized and adapted to receive a portion of the firmer. The firmer is then bolted or otherwise secured to the mounting bracket where the slotted portion prevents the limier from twisting out of alignment while in use. Depth of the firmer in a furrow may be adjusted by positioning the firmer within the slotted portion at the desired depth.

The above mentioned and other features and objects of this invention and the manner of attaining them, will become more apparent and the invention itself will be better understood by reference to the following description of an embodiment of the invention taken in conjunction with the accompanying drawings, wherein.

Figure 8A:
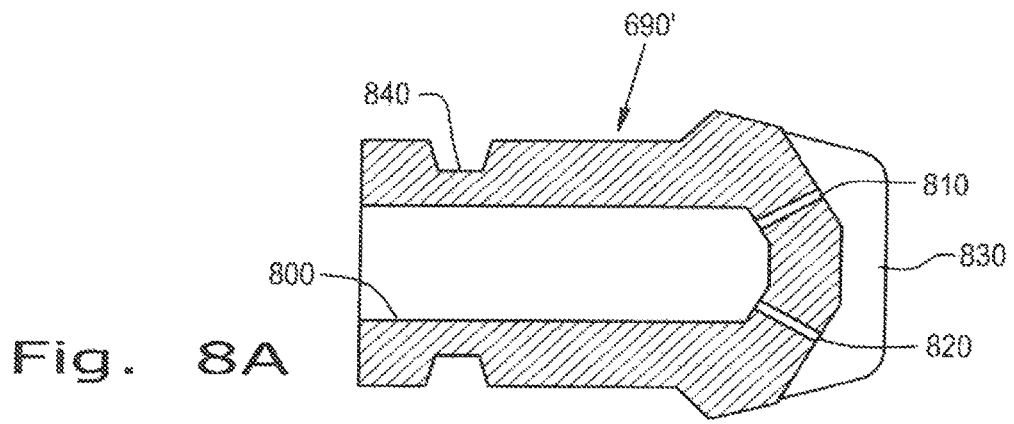
Figure 8B:
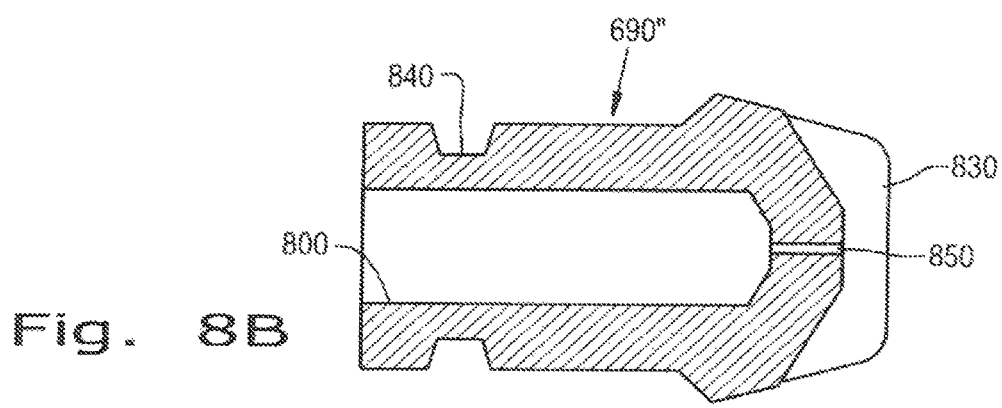
Figure 8C:
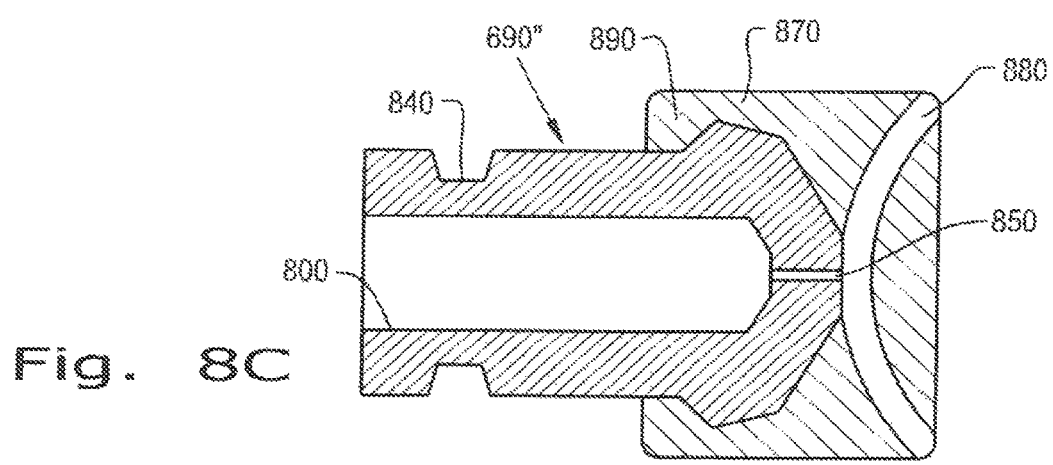

FIGS. 8A, 8B, and 8C are cross-sectional views of three embodiments of a liquid dispensing plug according to the present invention.

Figure 9:
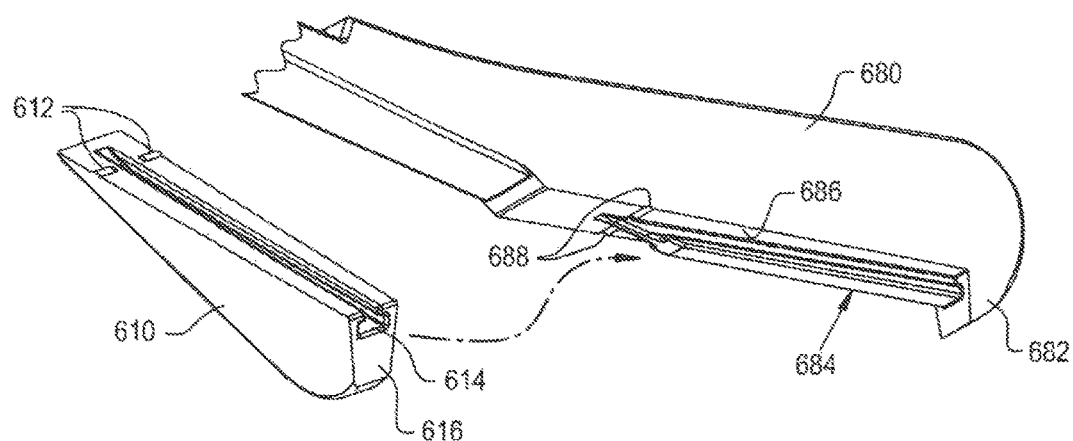

FIG. 9 is an enlarged view of the interconnection of the extender and the firmer body of the second embodiment of the present invention.

FIG. 10 is a perspective view of a third embodiment of the present invention.

Figure 11:
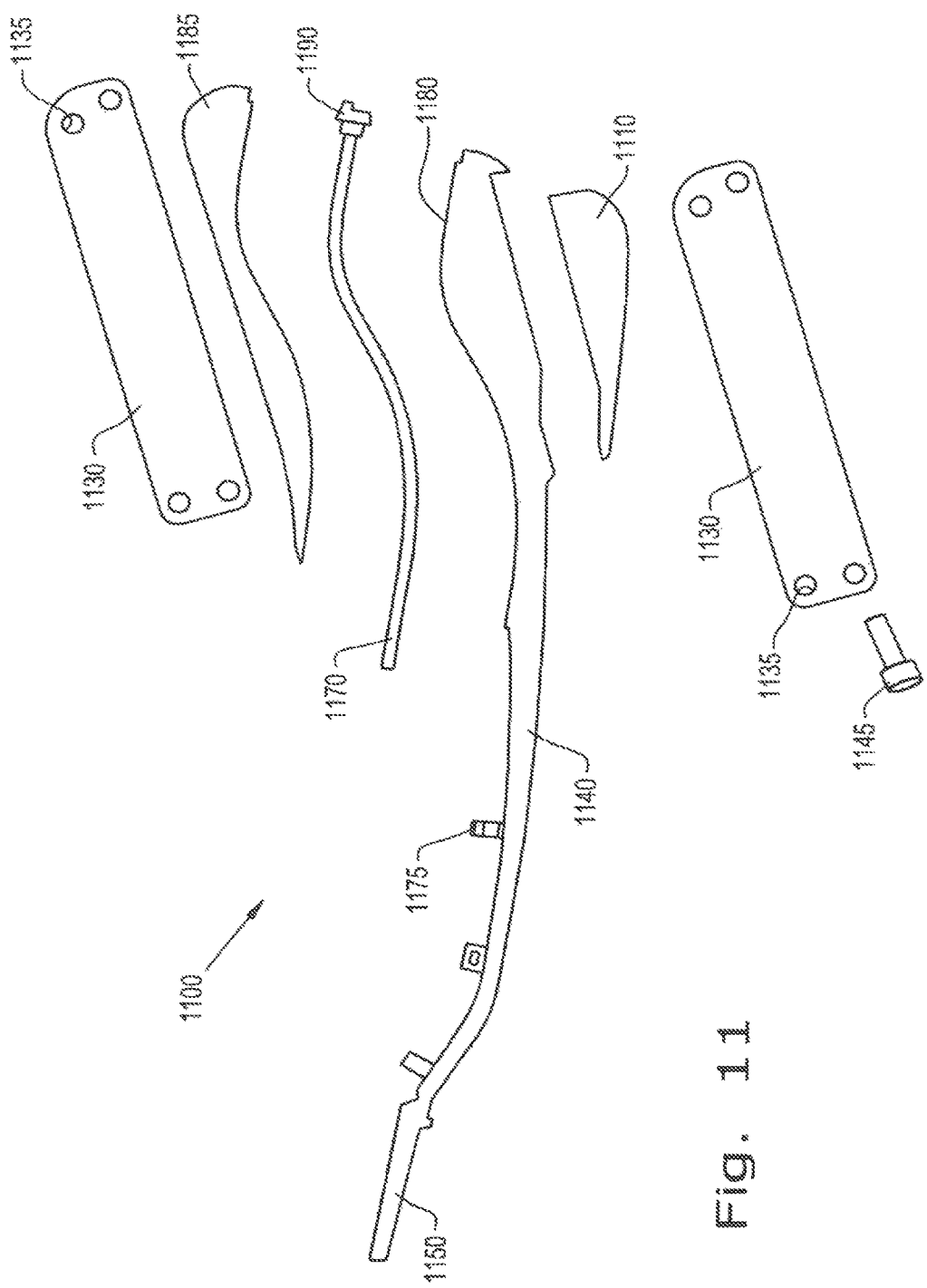

FIG. 11 is an exploded view of a fourth embodiment of the present invention.

Figure 12:
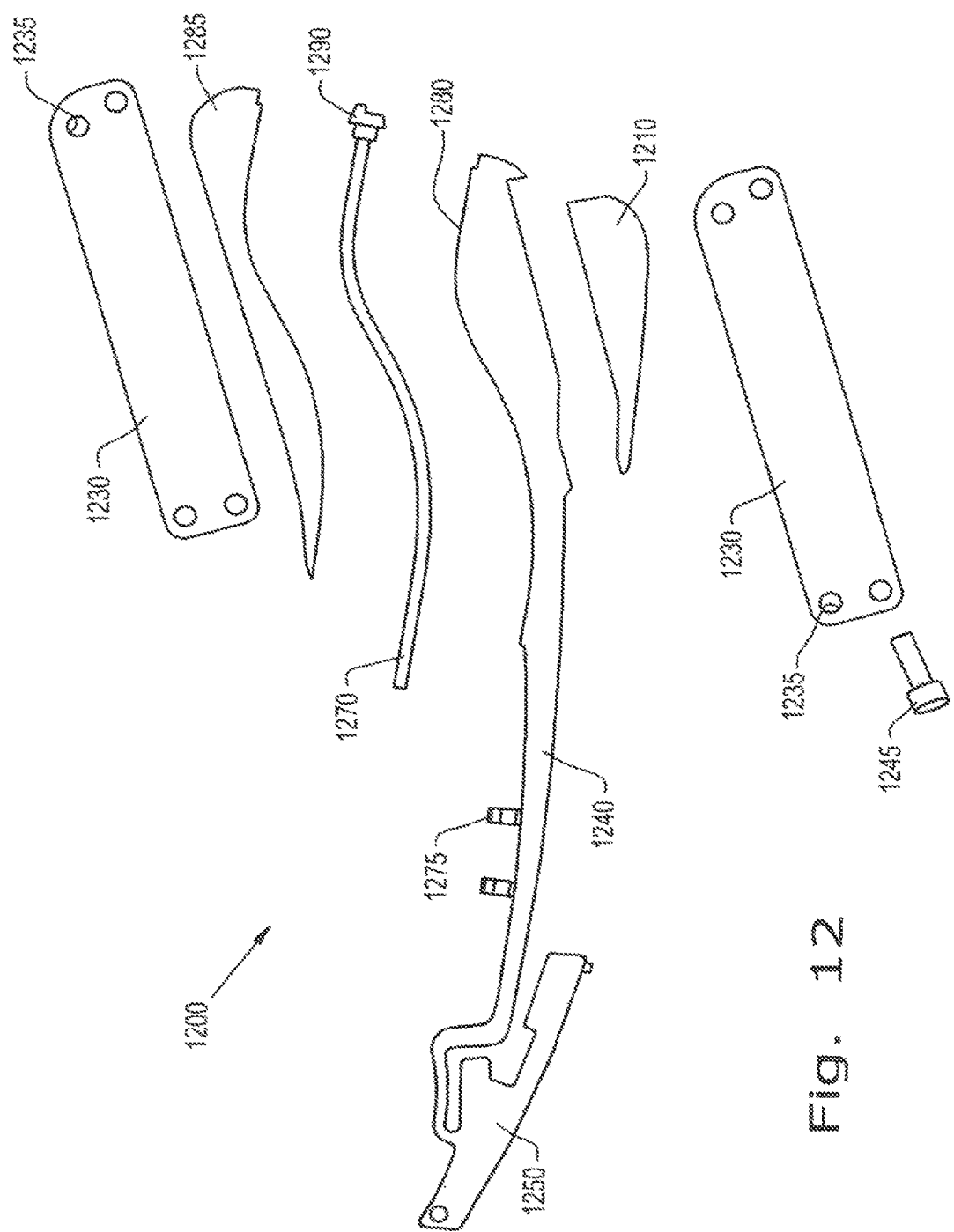

FIG. 12 is an exploded view of a fifth embodiment of the present invention.

Figure 13:
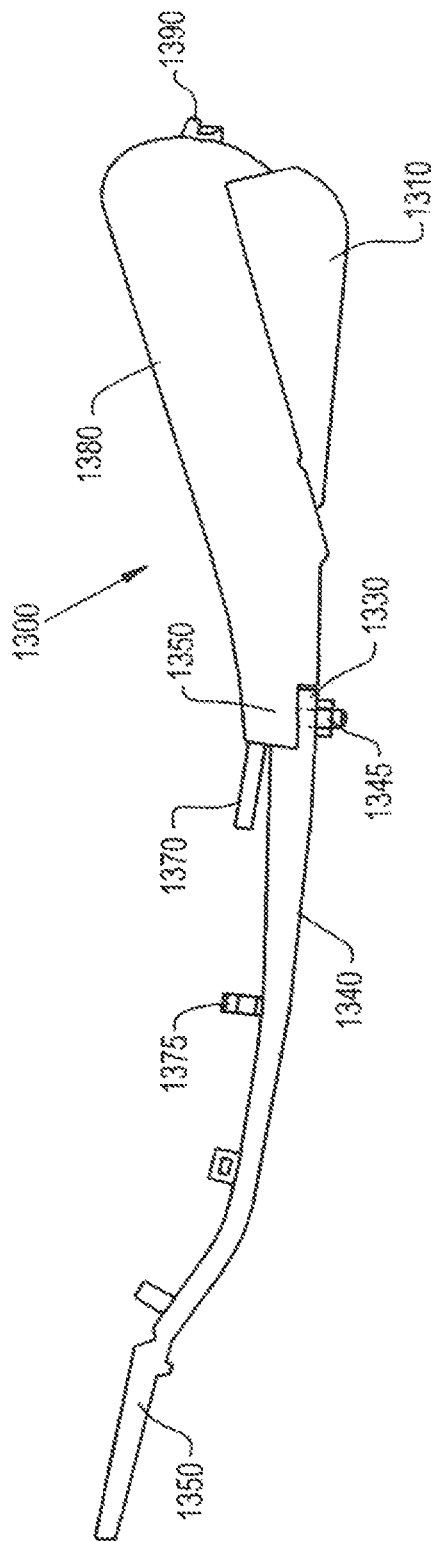

FIG. 13 is a side view of a sixth embodiment of the present invention.

Figure 14:
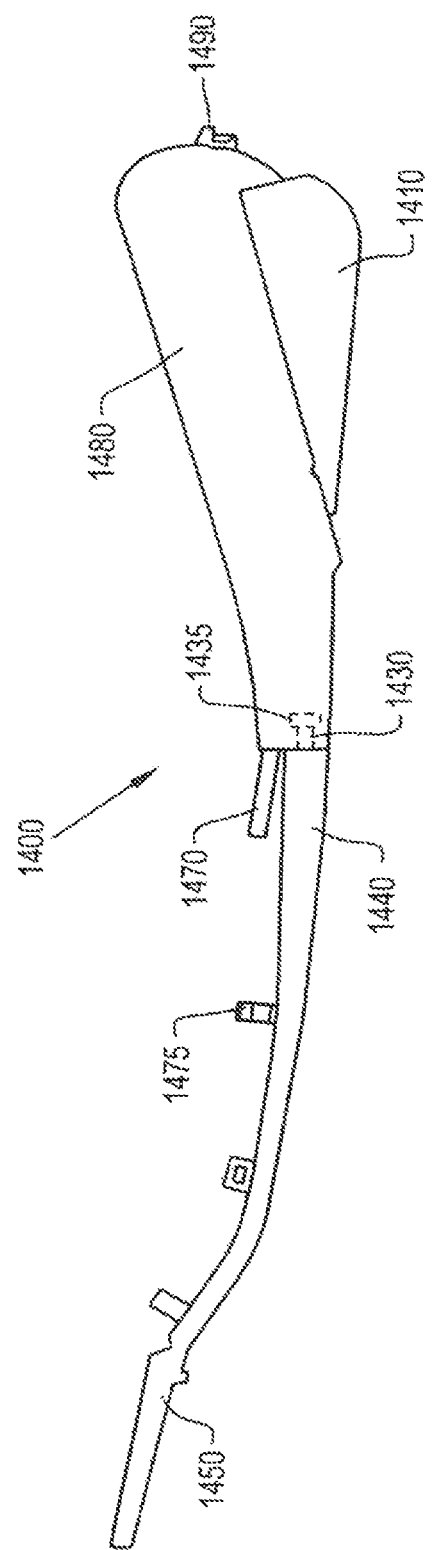

FIG. 14 is a side view of a seventh embodiment of the present invention.

Figure 15:
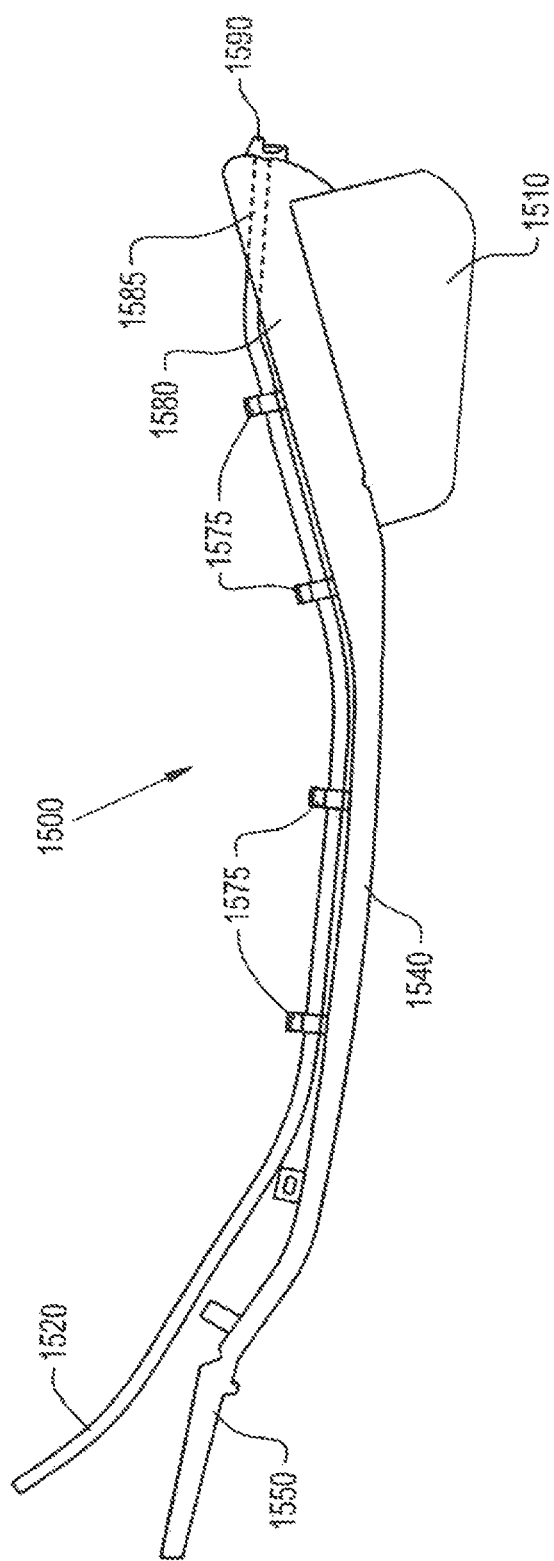

FIG. 15 is a side view of a eighth embodiment of the present invention.

Figure 16:
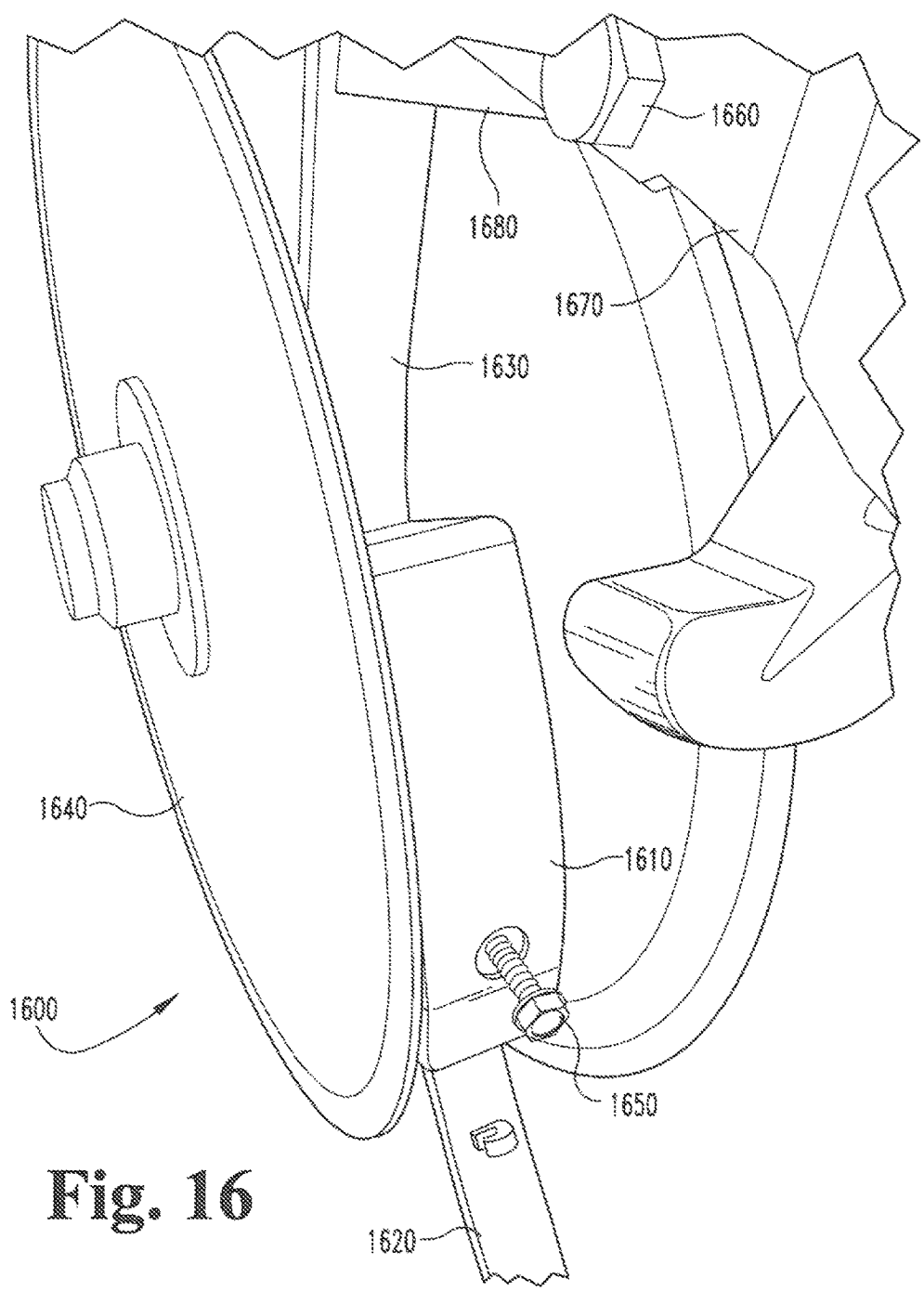

FIG. 16 is a perspective view of a mounting bracket according to one embodiment of the present invention.

Figure 17:
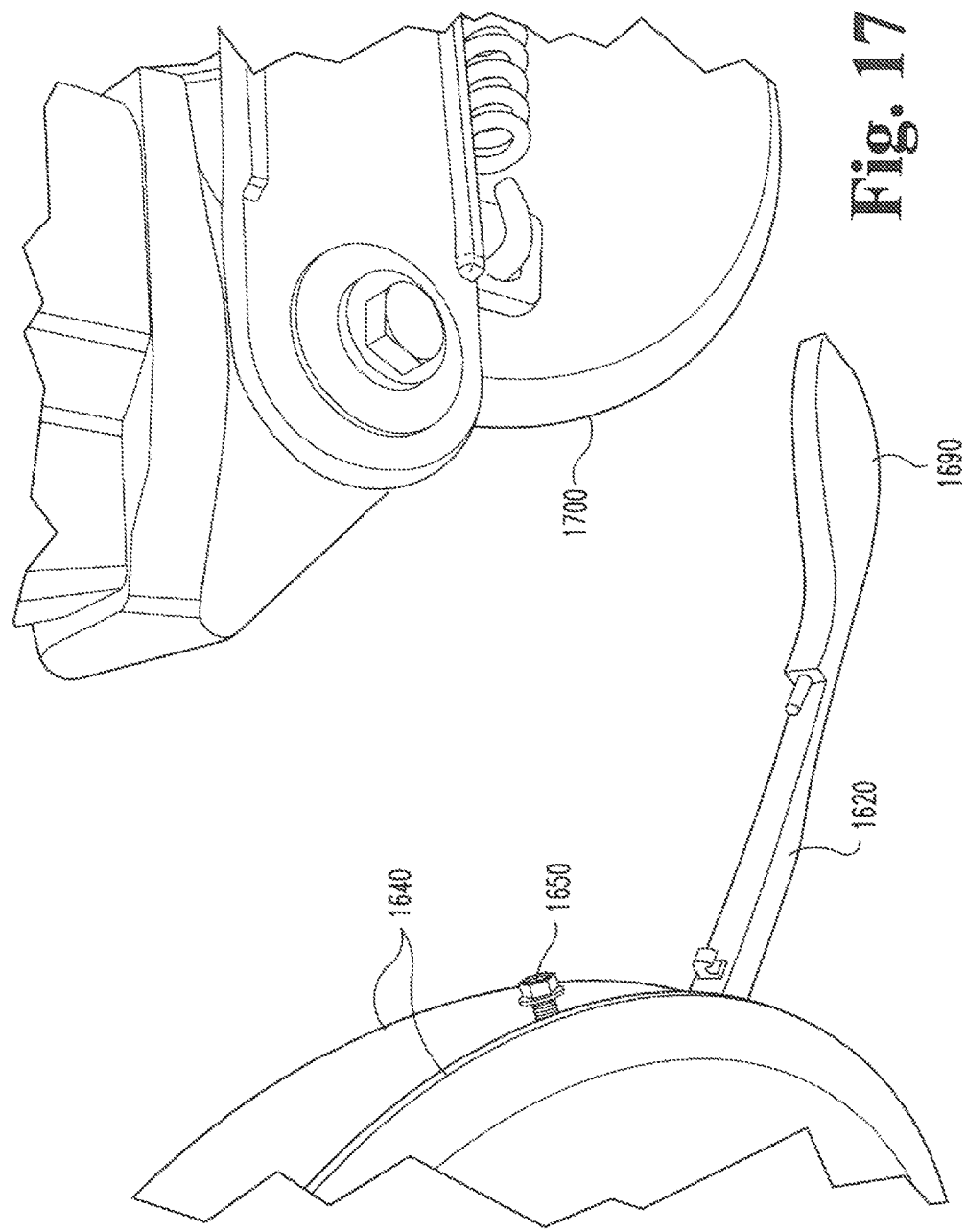

FIG. 17 is another perspective view of the mounting bracket shown in FIG. 16.

Figure 18:
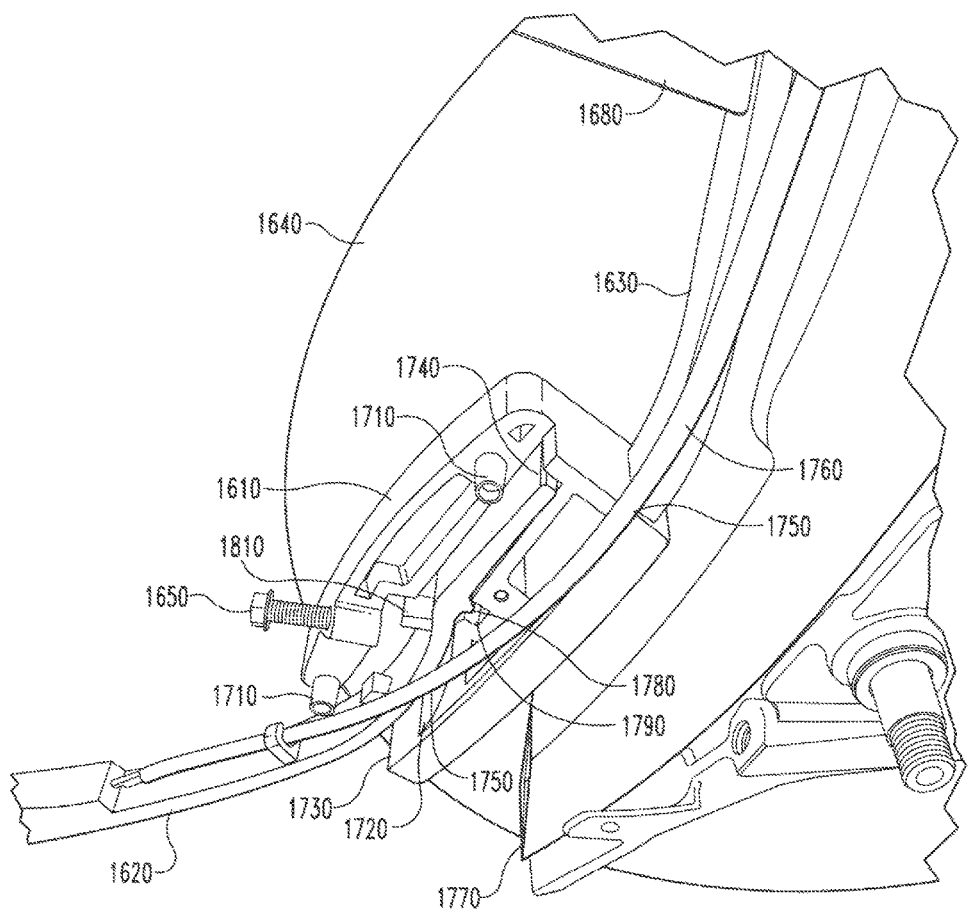

FIG. 18 is a side view of the mounting bracket shown in FIG. 16.

Figure 19:
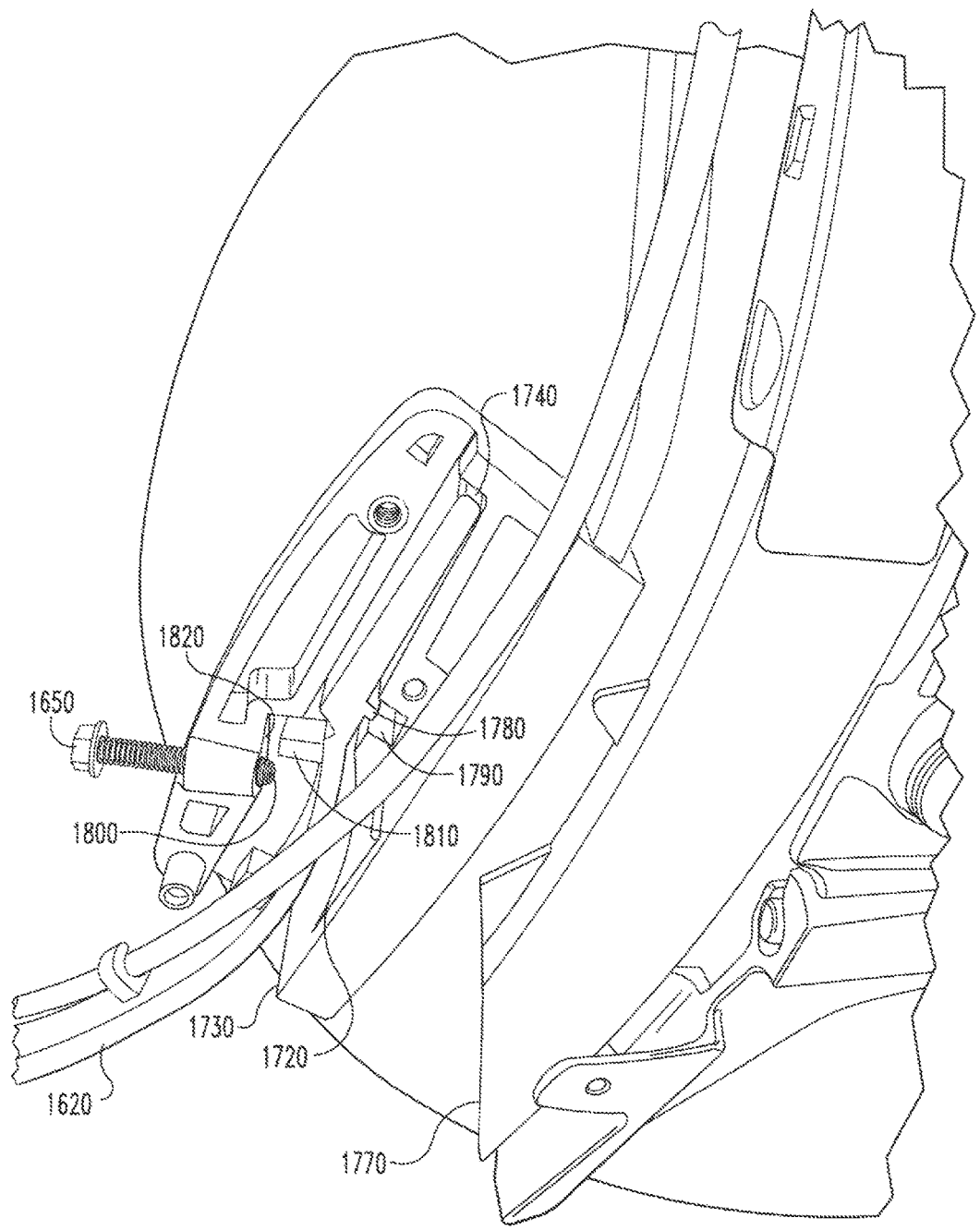

FIG. 19 is another side view of the mounting bracket shown in FIG. 16.

Figure 20:
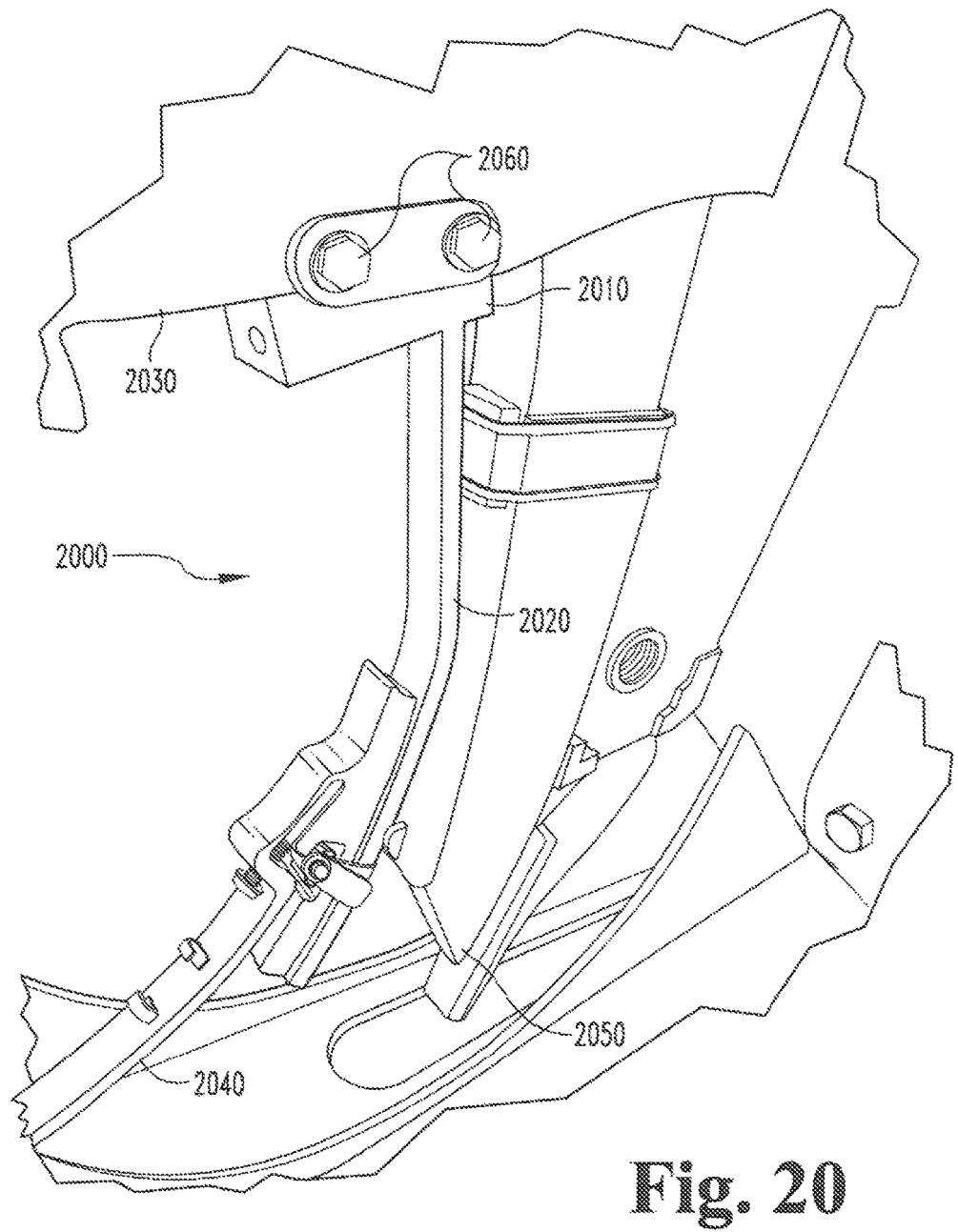

FIG. 20 is a perspective view of a mounting bracket according to another embodiment of the present invention.

Figure 21:
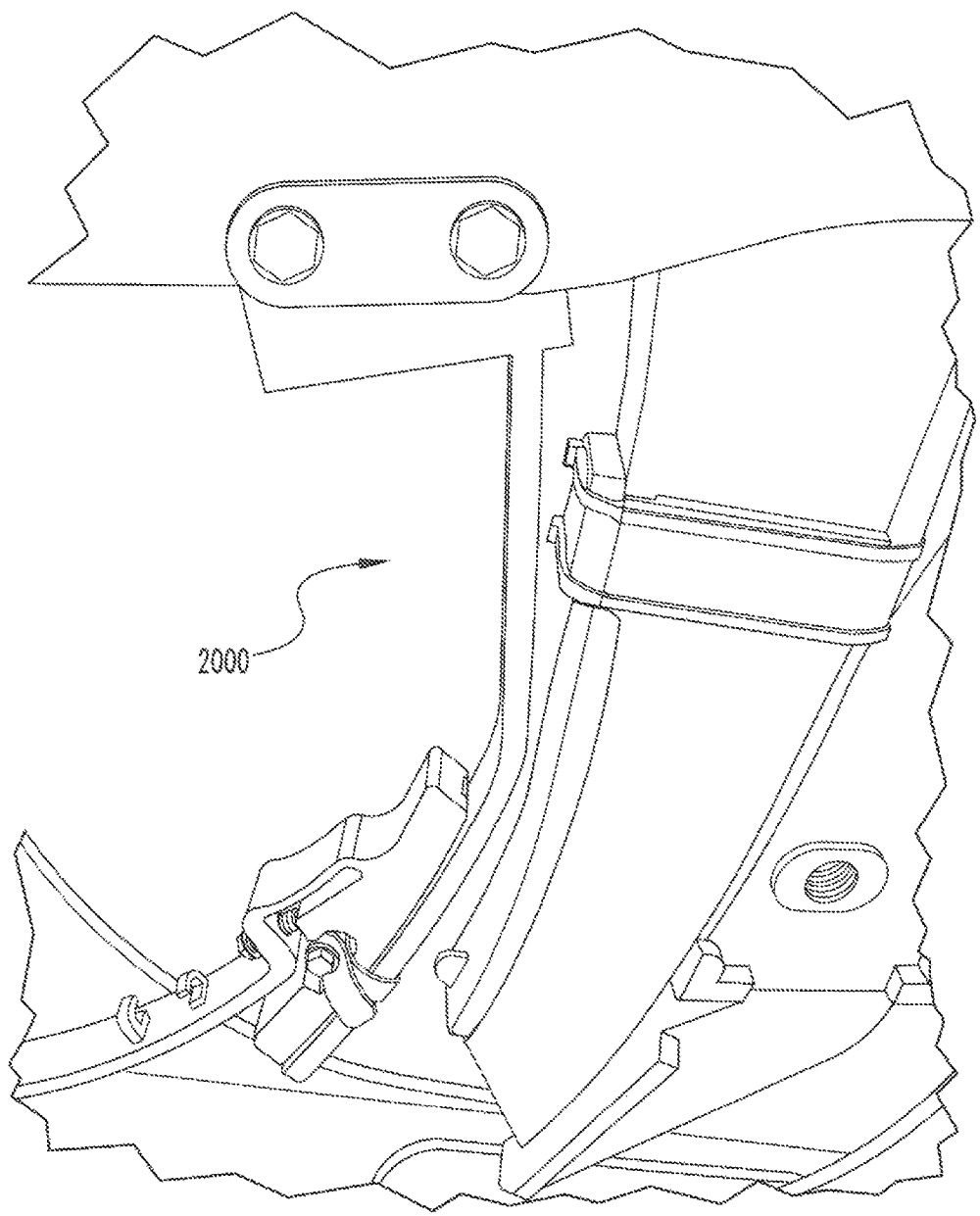

FIG. 21 is a side view of the mounting bracket shown in FIG. 20.

Figure 22:
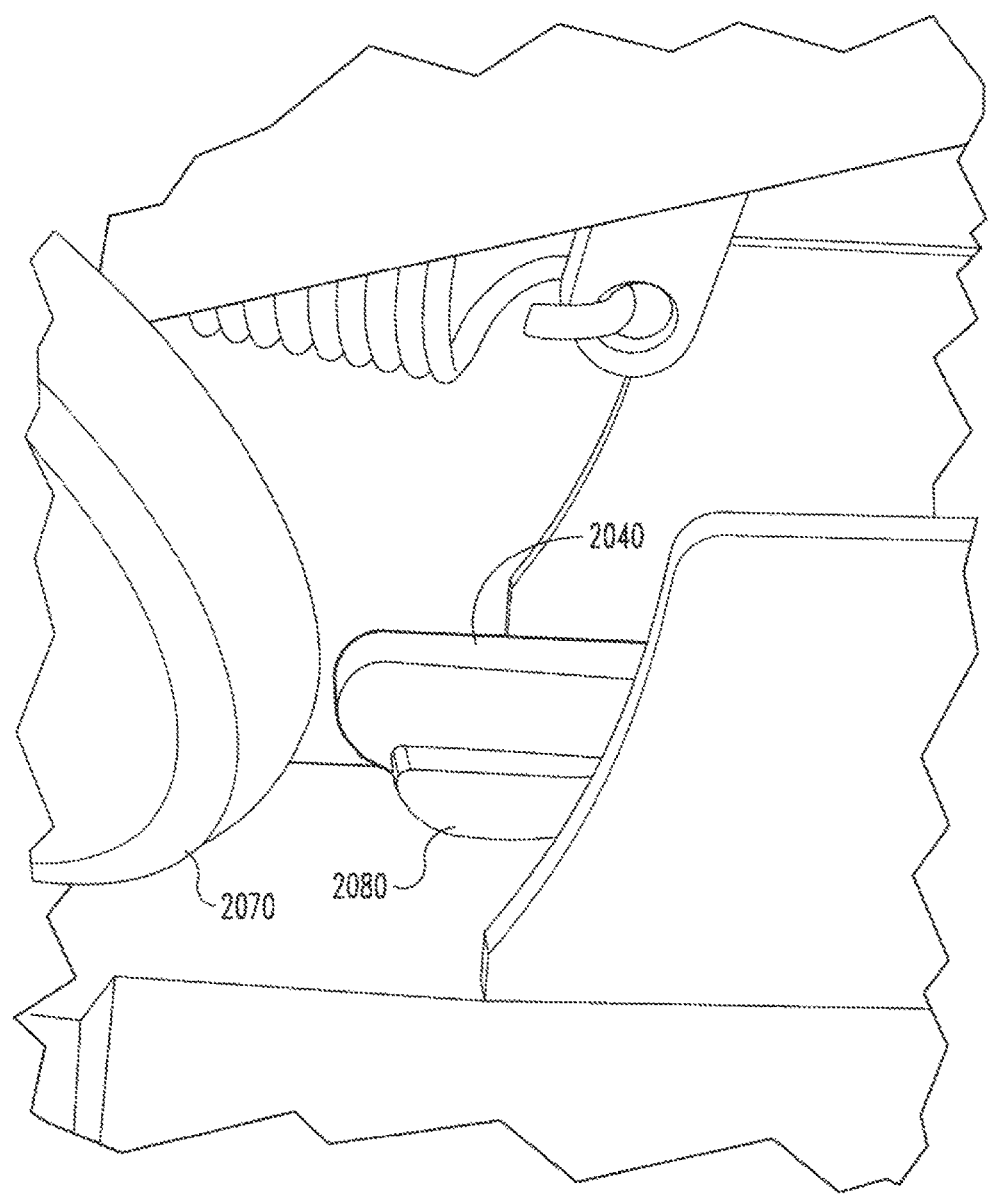

FIG. 22 is a side view of a firmer attached to the mourning bracket shown in FIG. 20.

Figure 23:
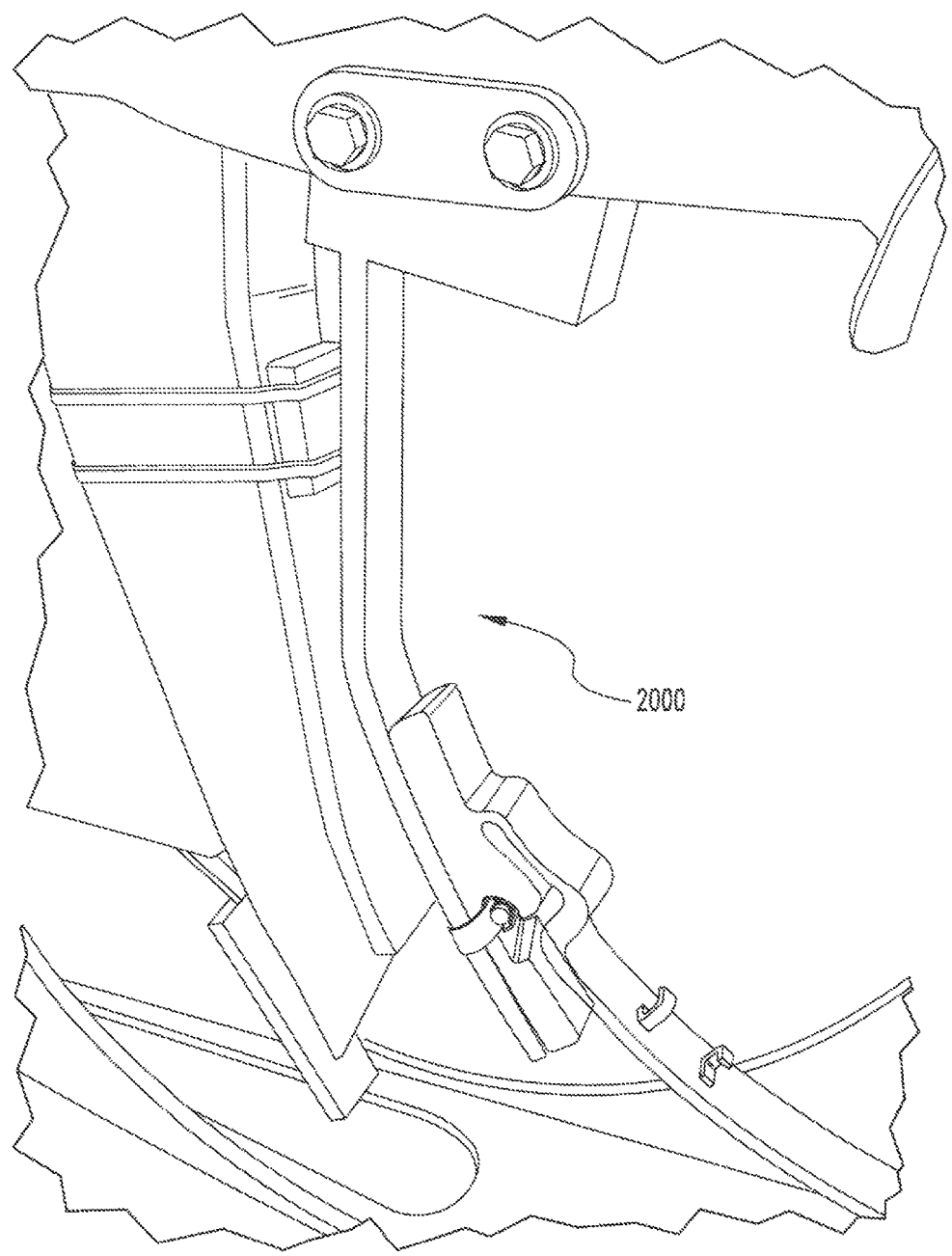

FIG. 23 is a perspective view of the mounting bracket shown in FIG. 20.

Figure 24:
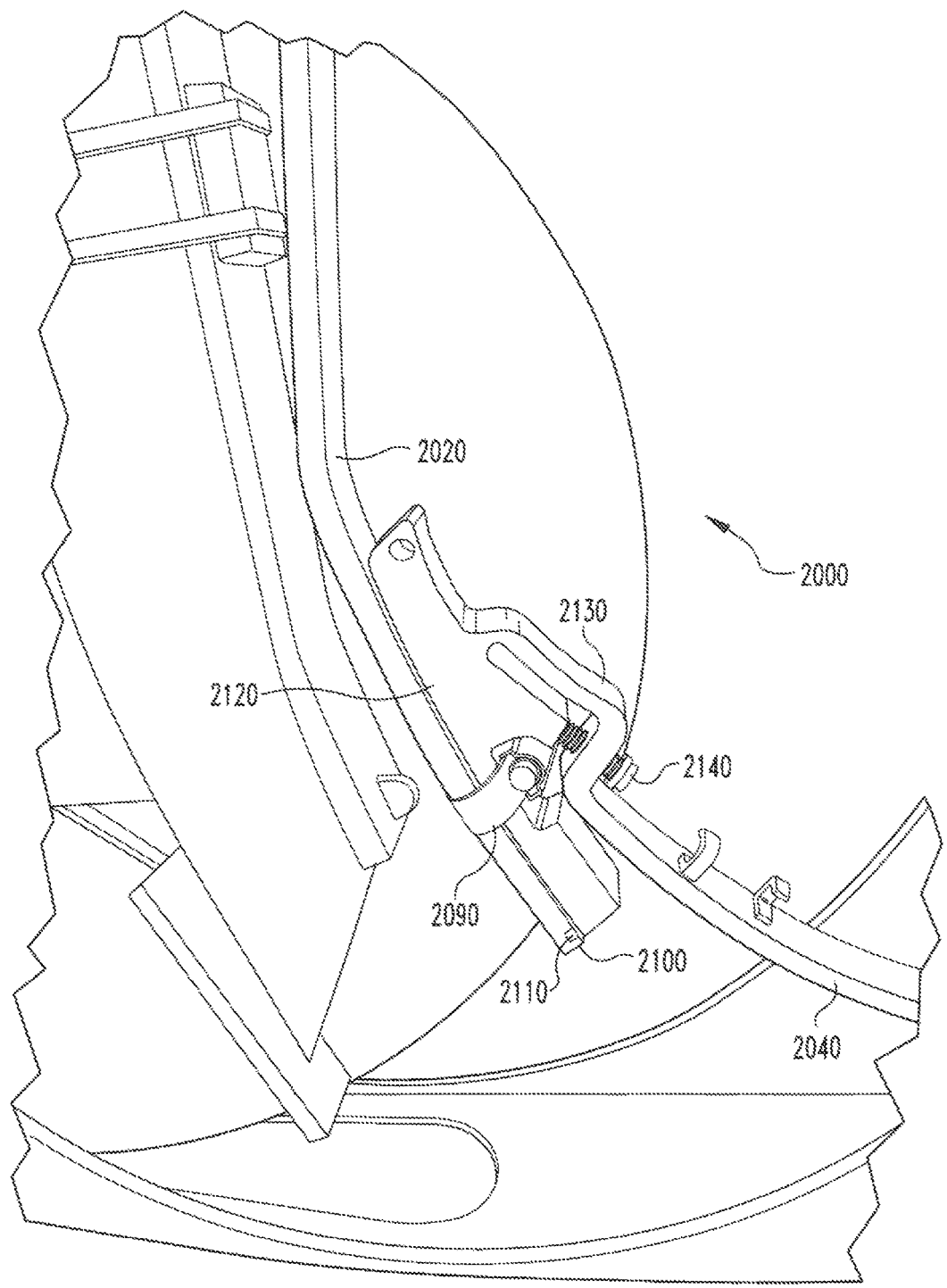

FIG. 24 is another Perspective view of the mounting bracket shown in FIG. 20.

Figure 25:
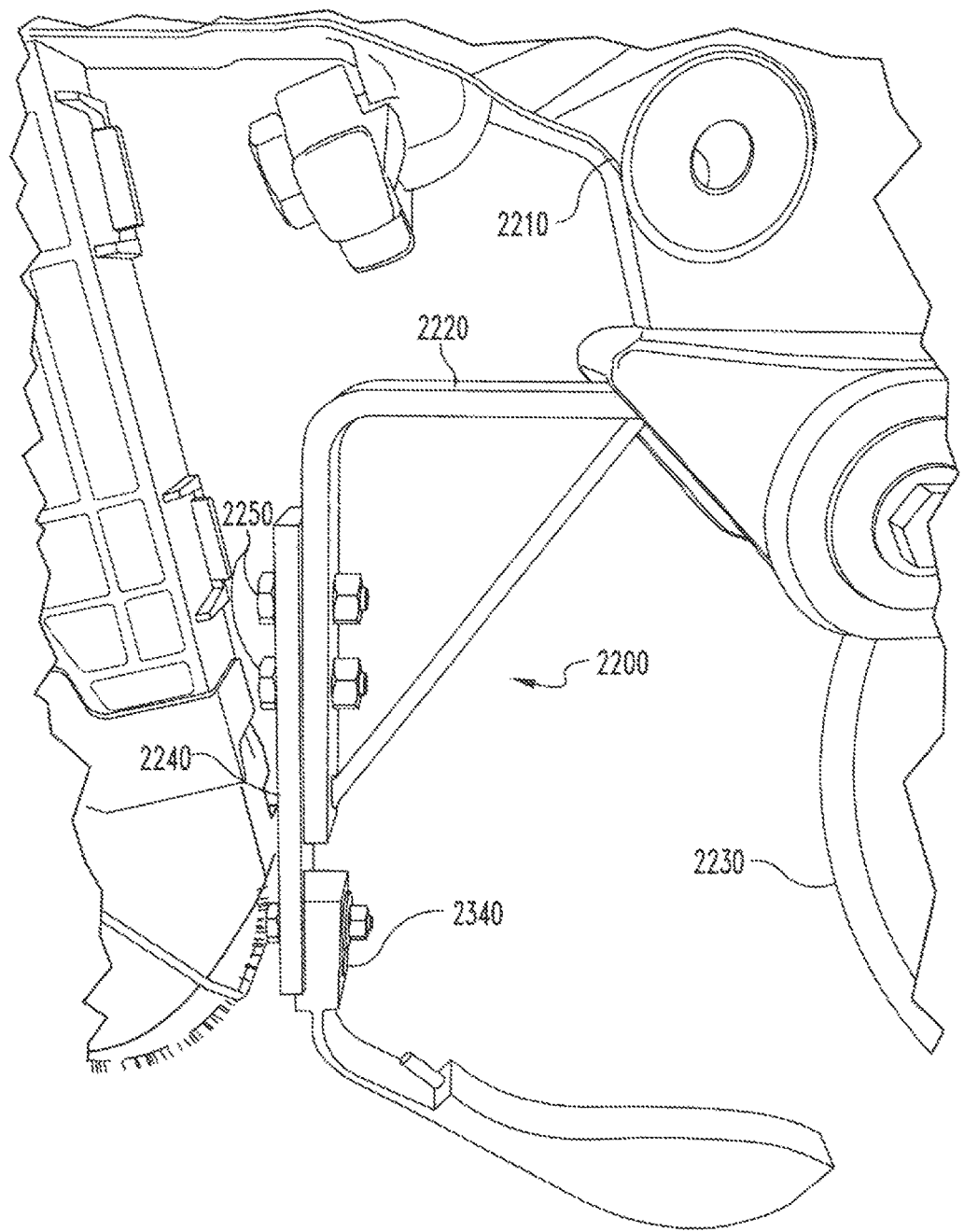

FIG. 25 is a side view of a mounting bracket according to still another embodiment of the present invention.

Figure 26:
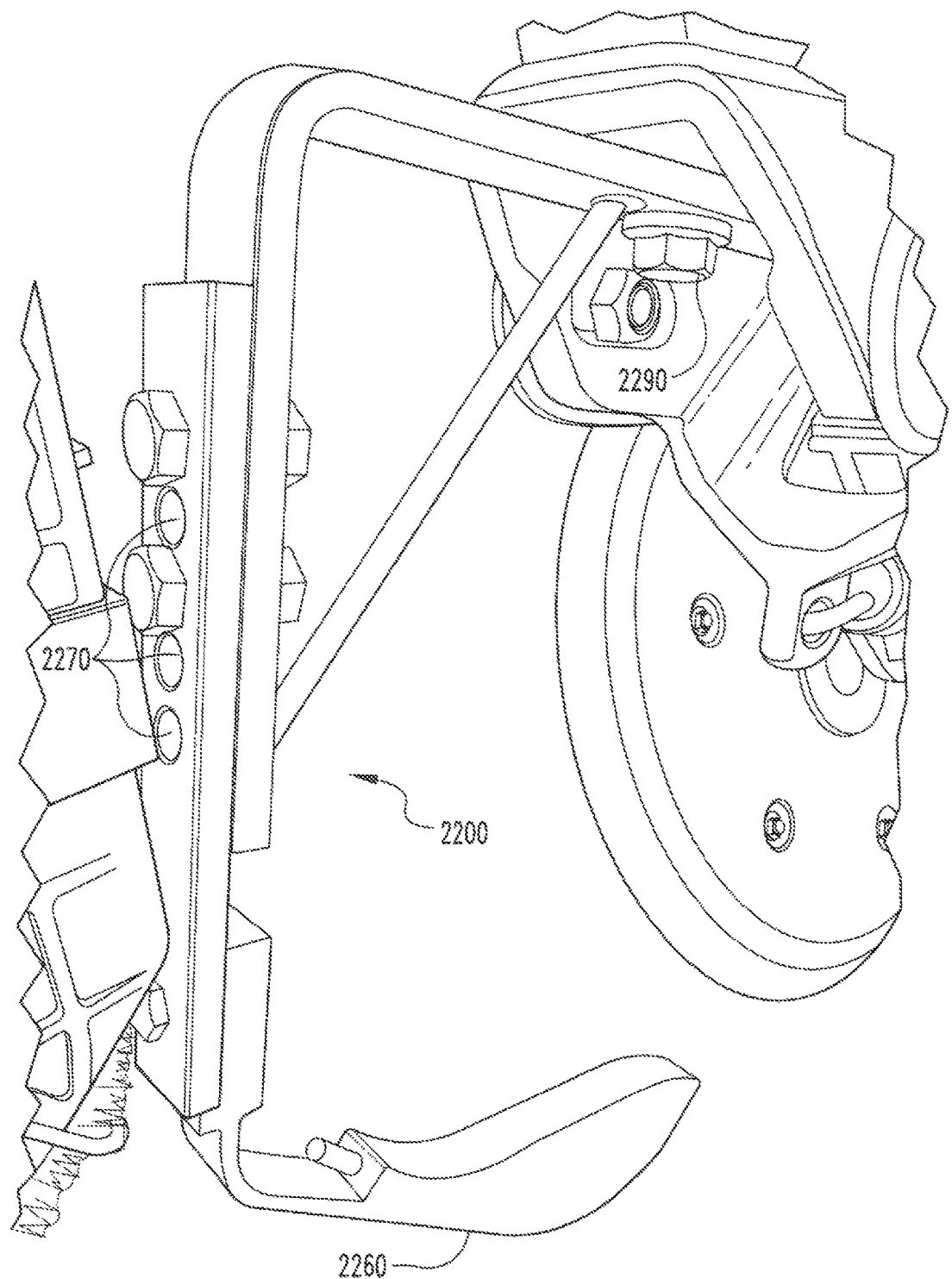

FIG. 26 is a perspective view of the mounting bracket shown in FIG. 25.

Figure 27:
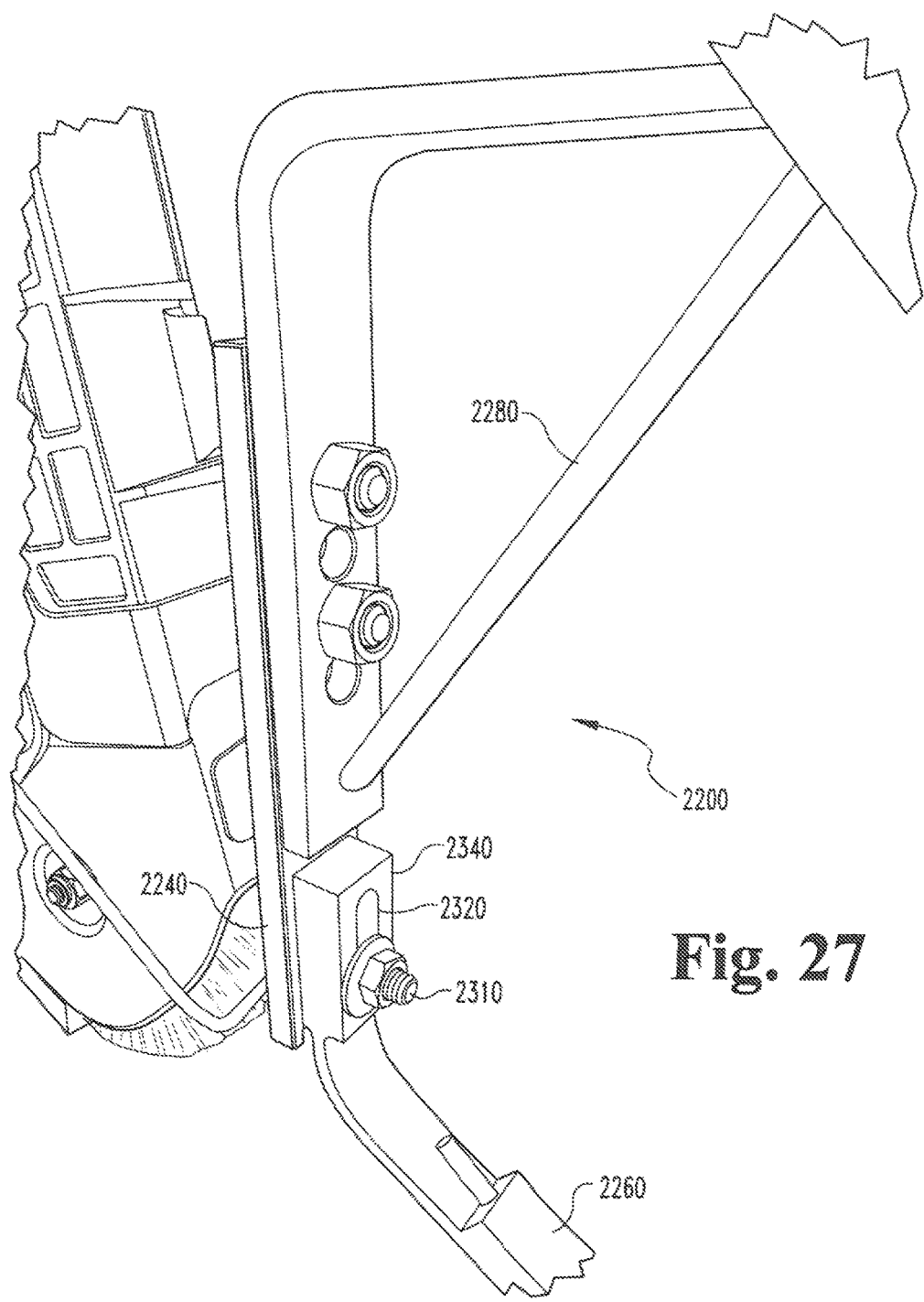

FIG. 27 is another perspective view of the mounting bracket shown in FIG. 25.

Figure 28:
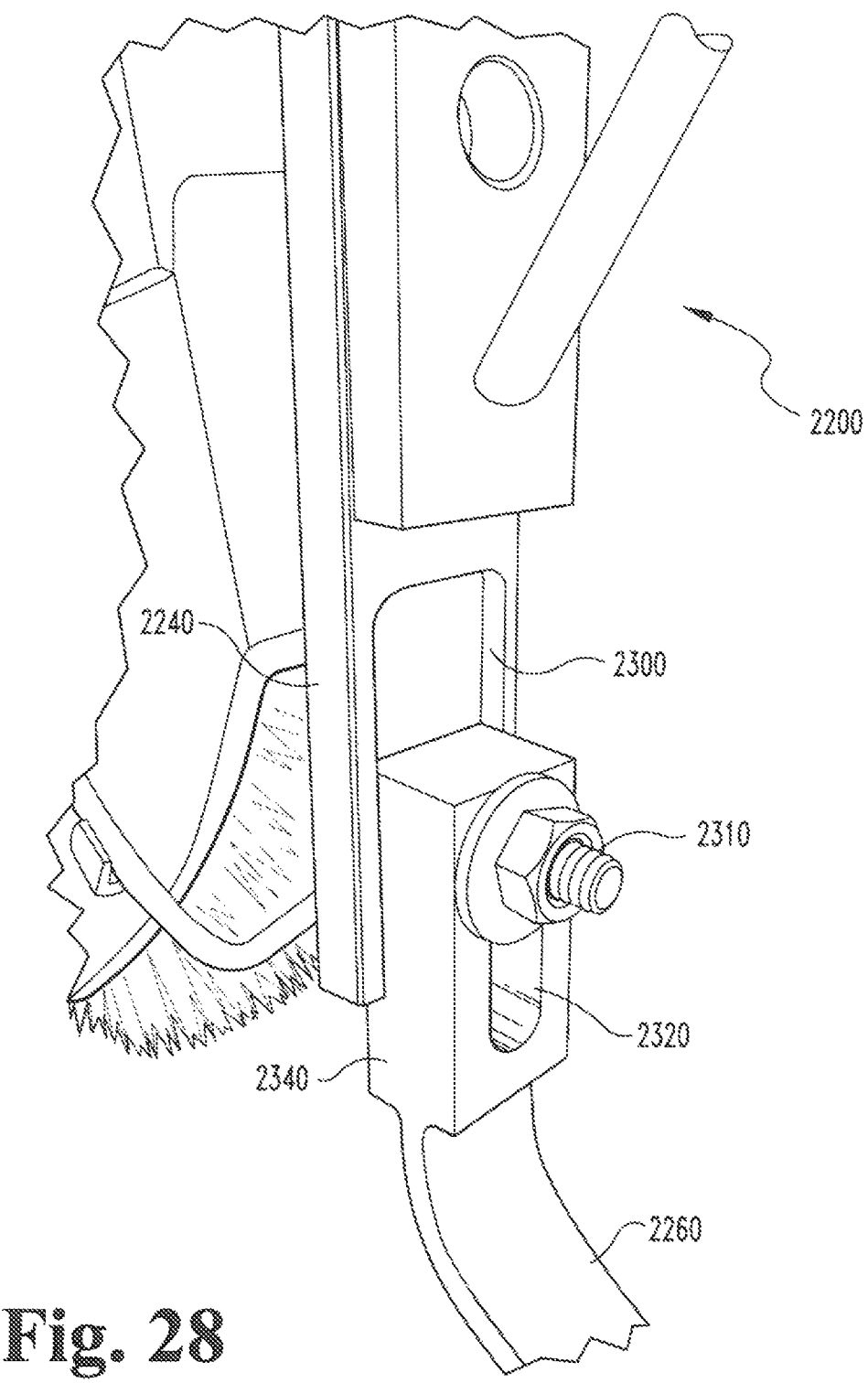

FIG. 28 is a close up perspective view of the mounting bracket shown in FIG. 25.

Corresponding reference characters indicate corresponding parts throughout the several views. Although the drawings represent embodiments of the present invention, the drawings are not necessarily to settle and certain features may be exaggerated in order to better illustrate and explain the present invention. The exemplification set out herein illustrates embodiments of the invention, in several forms, and such exemplifications are not to be construed as limiting the scope of the invention in any manner.

DESCRIPTION

The embodiments disclosed below are not intended to be exhaustive or limit the invention to the precise forms disclosed in the following detailed description. Rather, the embodiments arc chosen and described so that others skilled in the art may utilize their teachings.

Figure 1:
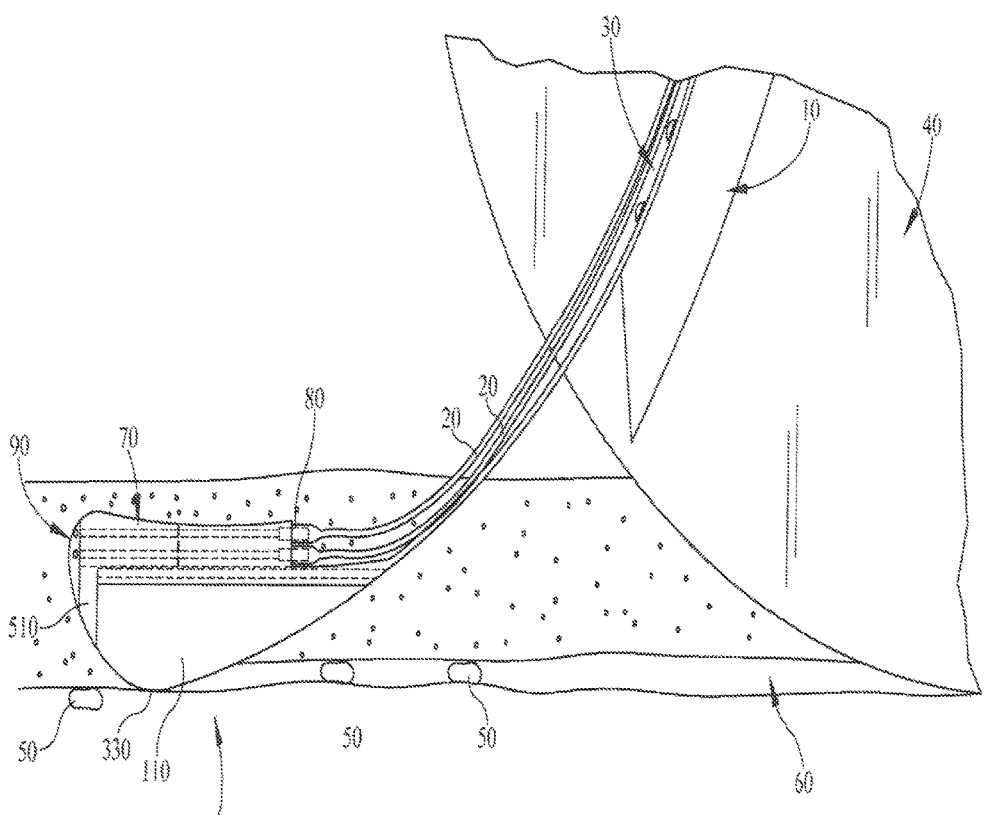
FIG. 1 is a side view of a first embodiment of the limier of the present invention shown in use.

FIG. 1. shows seed firmer 100 disposed in operation, having embedding pusher portion, or extender, 110 positioned relative to seed chute 10 in a conventional manner. Seed chute 10 is positioned relative to disc 40 by mount 30 so that chute 10 delivers seeds 50 to trough 60, with extender portion 110 being so positioned to embed seeds 50 into the soil of trough 60. Firmer 100 includes interior channel, 70 which extends from nipples 80 to end point 90, and is sized to receive tube 20, which in this exemplary embodiment involves conventional liquid tubes that deliver herbicides, fertilizers, pesticides, and/or mixtures of those chemicals to deposit on or near seed 50 once embedded.

Figure 4:
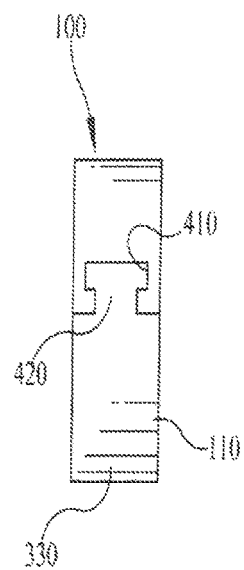
FIG. 4 is a side sectional view of the firmer of the first embodiment of the present invention showing the interconnection of the extender and firmer body.

Firmer 100 has an attachment portion, extender 110, that is located at a position on firmer 100 that contacts and embeds seeds 50 into the soil defining trough 60. In one embodiment, extender 110 fits into slot 410 in firmer 100 (see FIG. 4), with slot 410 bounded by hard stop portion 510 (see FIG. 5) that retains extender 110 against the direction of movement of firmer 100 over the soil. In this embodiment, extender 110 has tongue 420 having a "T" shape that slideably slot 410 so that when not in use, extender 110 may be easily replaced. When firmer 100 is in use, the force subjected to extender 110 urges it into hard stop 510. The exact shape and arrangement of the slideable engagement of slot 410 and tongue 420 may have several variations, for example a circular or arc shaped tongue and slot, or a tongue and slot with several angles.

Figure 3:
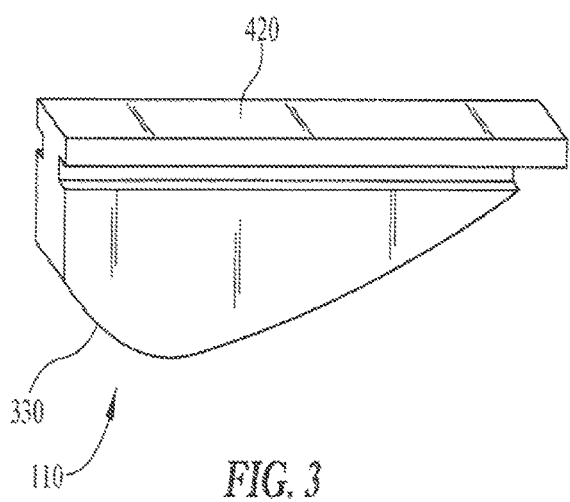
FIG. 3 is a perspective view of the first embodiment of the extender of the present invention.

Extender 110 (see FIG. 3) may be made of conventional materials so that seeds 50 are pressed by the conventional surface and the material wears similarly to conventional firmers. However, once embedding surface 330 wears away so as to diminish the capacity of firmer 100, extender 110 may b replaced. Replacement is made without removing firmer 100 from mount 30. Instead, a fanner may simply slide the old one of extender 110 and slide in a new one. Hard stop 510 limits the range of motion of extender 110, and when firmer 100 is drawn across trough 60 then extender 110 is pressed into hard stop 510.

Figure 2:
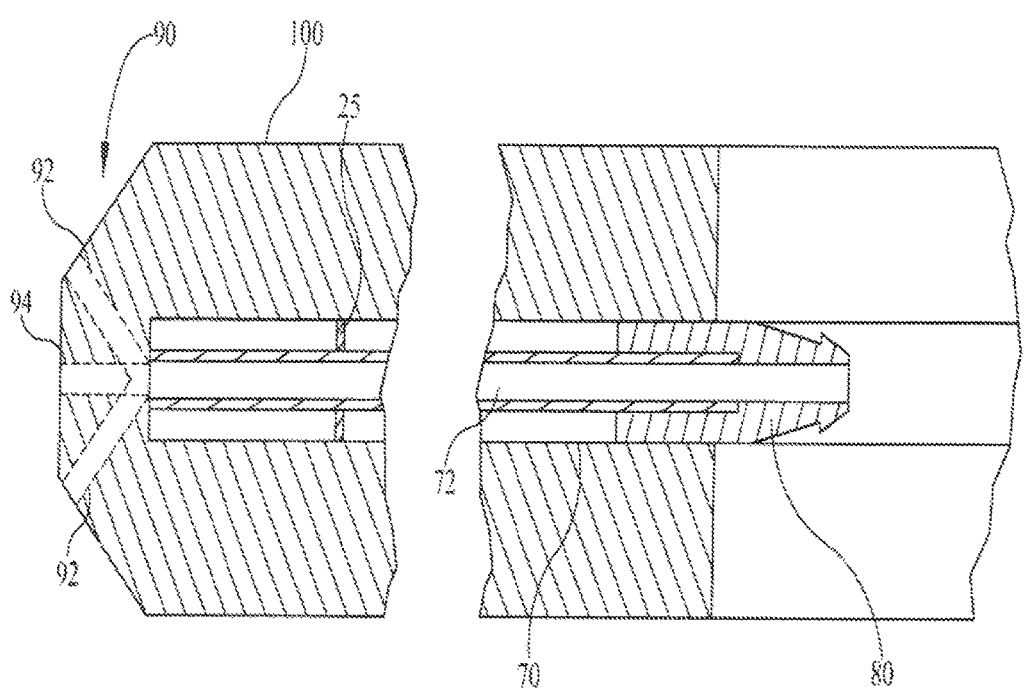
FIG. 2 is a sectional view of Figure 1 showing a through channel.
Figure 5:
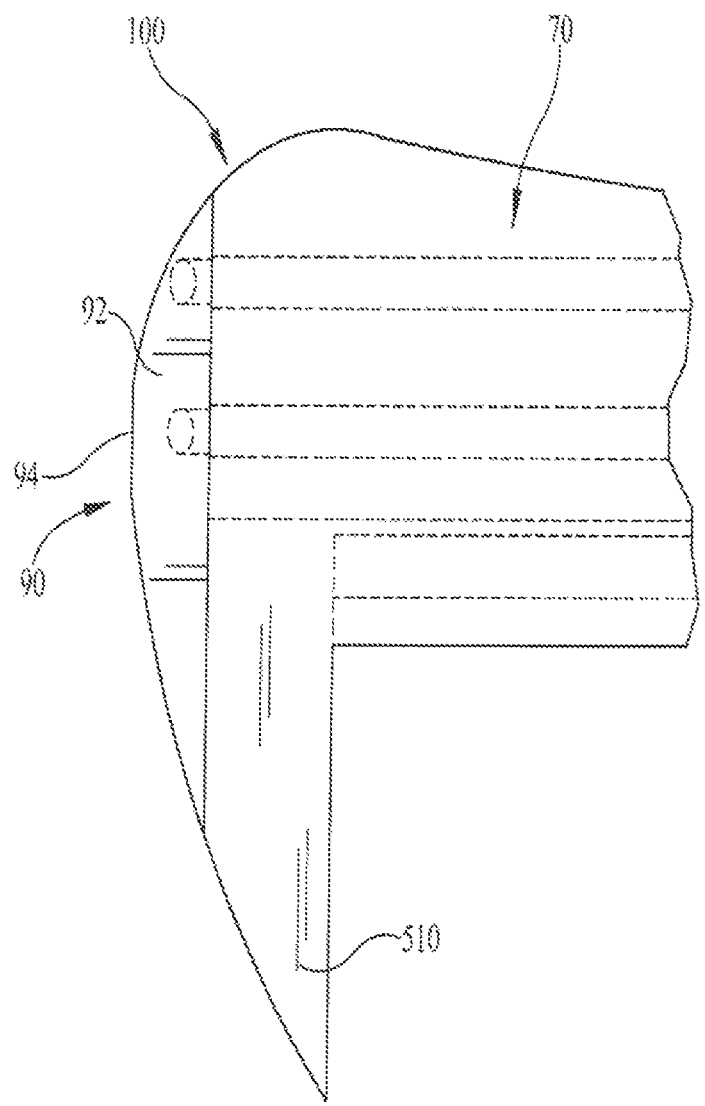
FIG. 5 is a perspective view of an end portion of the first embodiment of the present invention.

Firmer 100 also has an elongated interior channel 70 which is structured and arranged to receive tube 72, which in the disclosed embodiment is a convention liquid delivery tube, for delivering liquid on or near an embedded one of seeds 50 (see FIGS. 2 and 5). An open end of interior channel 70 is configured to receive nipple 80, which serves as a fluid connection between supply tube 20 and interior tube 72. Interior tube 72 is disposed within channel 70 and supported by tube holder 25, which in one embodiment includes a washer-shaped piece having a perimeter roughly congruent to the shape of interior channel 70.

End point 90 may be configured to be an outlet at one end of channel 70, with that end of channel 70 initially manufactured so that end point 90 closes one end of channel 70. This allows customization of a single piece, so that the exit holes may be drilled to suit the particular application. For example, a straight hole in facing surface 94 delivers liquid directly over embedded seed 50 (a "straight shooter"), which may be good for an insecticide, while side surfaces 92 may have holes drilled in them so that liquid is delivered on each side of embedded seed 50 (a "split shooter"), which may be better for fertilizer. In one embodiment (not shown), channel 70 is structured and arranged to accommodate multiple tube so that a series of end points are associated with each tube, allowing for combinations of straight shooters and split shooters in a single seed firmer.

Figure 6:
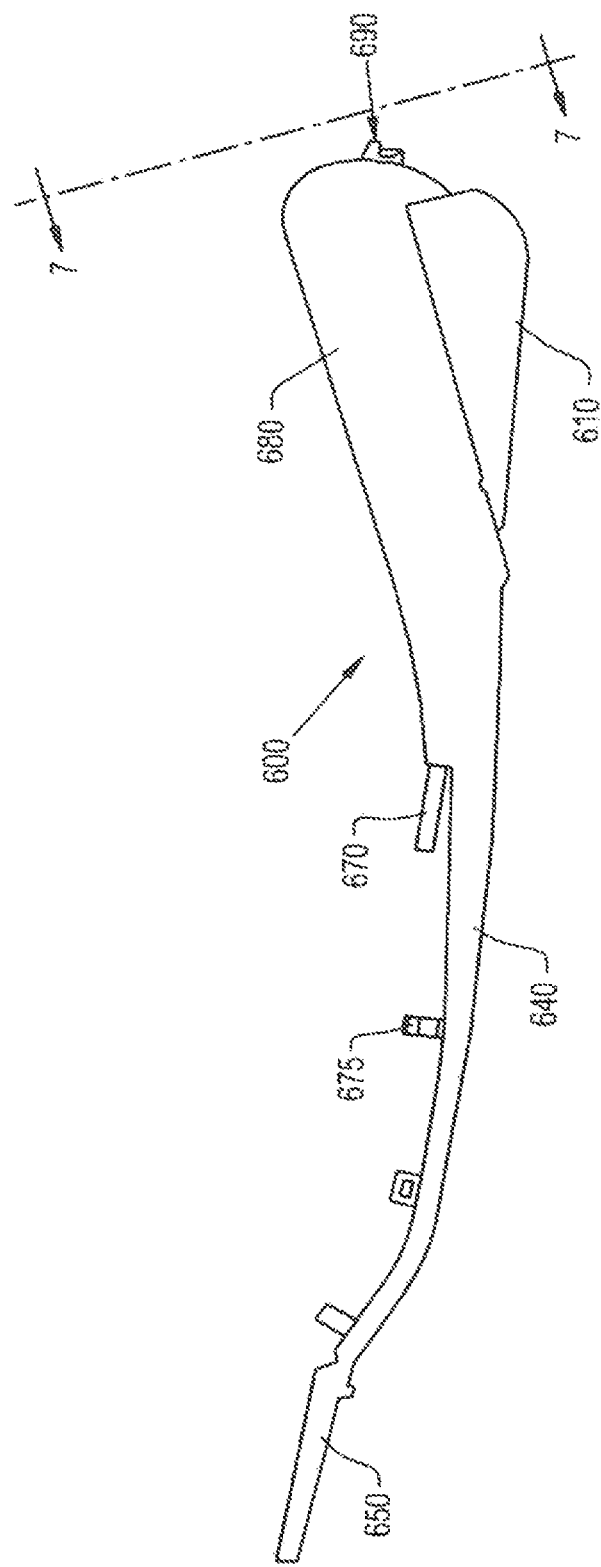
FIG. 6 is a perspective view of a second embodiment of the present invention.

Other embodiments have a tube disposed within the body of the firmer, for example the embodiments of FIGS. 6 and 10. The embodiment of FIG. 6 has flexing portion 640 coupling flat end 650 and embedding arm 680. Pipe 670 extends from embedding portion 680 and extends within portion 680 to spray nozzle 690. Pipe 670 is structured and arranged to receive a flexible tube (not shown) over its exposed end, and may have a roughed, serrated, or ridged surface to further engage the flexible tube. Firmer 610 may also have one or more tube retention pieces 675 to retain the flexible tube with firmer 600. Extender 610 enrages embedding arm 660 AS shown in FIG. 9 and described below. The embodiment of FIG. 10 has flexing portion 1040 coupling chute end 1050 and embedding arm 1080. Pipe 1070 extends from embedding portion 1080 and extends within portion 1080 to spray nozzle 1090. Pipe 1070 is structured and arranged to receive a flexible rube (not shown) over its exposed end, and may have a roughed, serrated, or ridged surface to further engage the flexible tube. Firmer 1000 may also have one or more tube retention pieces 1075 to retain the flexible tube with firmer 1000. Extender 1010 engages embedding arm 1080 as shown in FIG. 9 and described below.

Embodiments of the inventive firmers of the present application may be mounted on the planting equipment in a variety of ways. In one embodiment, as shown in FIG. 10, firmer 1000 includes seed chute connection portion 1050 structured and arranged to be connected to the exterior mounting of a seed chute (not shown). In another embodiment, shown in FIG. 6, firmer 600 has flat end 650 so that firmer 600 may be attached within a planter bracket assembly similar to that disclosed in the aforementioned U.S. Pat. No. 7,497,174. Embodiments disclosed in the present application may be adapted to either mounting style.

Figure 7:
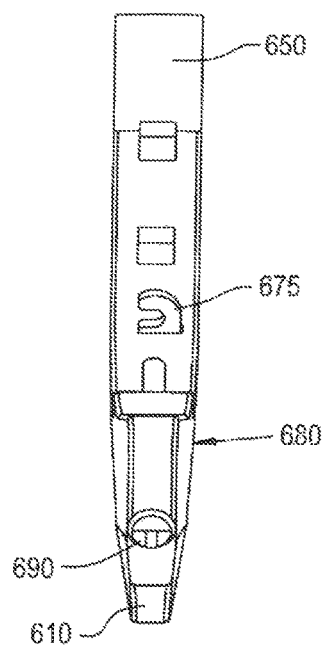
FIG. 7 is an enlarged view of the liquid dispensing end of the second embodiment of the present invention.

In addition to the alternative styles of mounting to a seed chute (not shown), embodiments of the invention also have alternative arrangements of the replaceable embedding portion of the firmer. FIG. 6 shows firmer 600 having embedding end 680 with spray nozzle 690 and extender 610. Firmer also has flat end 650 merging into flexible arm 640 which resiliently biases embedding end 660. Liquid, such as pesticide, herbicide, and/or fertilizer, may be directed proximate embedding end 680 by a flexible tube (not shown) being engaged with arm 675 and attaching to fixed tube 670. Fixed tube 670 extends through embedding end 680 to nozzle 690. FIG. 7 shows a view of embedding end 680 from the perspective of the trailing embedded seed. Extender 610 is the portion of firmer 600 pushing a seed (not shown in FIG. 7) into the ground. In this embodiment, embedding end 680 generally narrows to the general size of the seed, with nozzle 690 extending over the location of the embedded seed.

Firmer 600 may have alternative versions of nozzle 690. In the alternative embodiment of FIG. 8A, central bore 800 extends through cylindrically shaped nozzle 690' and terminates at angled passages 810 and 820, which are structured and arranged to direct liquid to a position offset from the seed. Flange 830 extends outward to shield the space through which angled passages 810 and 820 direct fluid. Valley 840 is located proximate the open end of central bore 800, and is structured and arranged to be engaged by a ridge or hump within embedding end 660 to secure the position of nozzle 690'. The alternative embodiment of FIG. 8B has central passage 850 for directing fluid onto the seed. A further alternative embodiment is shown in FIG. 8C, which includes splitter 692 that attaches over nozzle 690' so that fluid coming through central passage 850 is directed in other directions through splitter holes 694, for example with similar angles as passages 810 and 820 of the embodiment of FIG. 8A. The exact shape, size, and angle of splitter holes 694 may be varied for several unillustrated alternative embodiments of splitter 692.

In the embodiment of FIG. 6, extender 610 engages embedding end 680. One embodiment of the connection of extender 10 and embedding end 680 is depicted in the arrangement of FIG. 9. In this arrangement, embedding end 680 has T-shaped tongue 684 extending from stop portion 682 and below bottom surface 686. Tongue 684 is structured and arranged to match the contour of recess 614 of extender 610. Near the end of tongue 684 opposite stop 682, bottom surface 686 has a recess portion 688. Recess portion 688 is structured and arranged to engage with ribs 612 which extend from extender 610. The engagement of ribs 612 with recess portion 688 allows extender 610 to be slid onto tongue 684 without any impediment, and when stop end 616 of extender 610 nears stop portion 682, then ribs 612 are close to engagement with recess portion 688 and thus provides a slide in and lock procedure for securing extender 610 with embedding end 680.

Other embodiments of the invention involve the firmer having a central portion with attachment, flexing, and embedding portions connected together by a sandwiching arrangement between corresponding sidewalls, for example the embodiments of FIGS. 11 and 12. In the embodiment of FIG. 11, firmer 1100 has flat end 1150, central portion 1140, and embedding end 1180 formed in one integral piece. Pipe 1170 is disposed over embedding portion 1180, and under upper portion 1185, with extender 1110 abutting embedding portion 1180. Sidewalls 130 sandwich those components, and in some embodiments hold all together, using connectors 1145 received in sidewall holes 1135. In other unillustrated embodiments, extender 1110 may have a tongue-groove connection with embedding portion 1180, and be independent of, or alternatively sandwiched between, sidewalls 1130. Connectors 1145, which may be in the form of a screw, rod, putty, or other piece of connecting material and combinations of those, may secure sidewalls 1130 as sandwiching plates holding other components in their desired positions. In some embodiments, one or more connectors 1145 are releasable or otherwise alterable, while in other embodiments all connectors 1145 are fixed and engage sidewalls 1130, including extending through other components of firmer 1100. The embodiment of FIG. 12 has similar features to that of FIG. 11, with the exception that chute end 1250 being structured and arranged for connection to a conventional seed chute (not shown).

A further embodiment having separate attaching and embedding portions is shown in FIG. 13. In this embodiment, flexible portion 1340 and flat end 1350 (which could in another embodiment be replaced by a chute end, not shown here) ape formed as a single integral piece, and embedding arm 1380 is formed as a separate piece. In this embodiment, pipe 1370 extends from connection portion 1350 to spray nozzle 1390, and the bottom of connection portion 1350 abuts flange 1330 of flexible portion 1340. Extender 1310 is connected to embedding arm 1380 with a tongue and groove connection similar to some previous embodiments. Connector 1345, which may be in the form of a screw, rod, putty, or other piece of connecting material, extends through flange 1330 to couple with connection portion 1350. In alternative embodiments (not shown), pipe 1370 may enter embedding arm 1380 above the overlap with flexible portion 1340 so that connector 1345 in that embodiment is affixed from the top.

Another embodiment shown it FIG. 14 has a two piece design for firmer 1400, with flexible portion 1440 having connection portion 1430 inserted into receiving portion 1435 or embedding portion 1480. In this embodiment, at end 1450 may b alternatively shaped as a chute portion (not shown), and extender 1410 may be attached to embedding portion 1480 by a tongue and groove connection, or other connection.

An additional embodiment having a less substantial embedding portion is shown as firmer 1500 in FIG. 15. In this embodiment, flat end 1550 (which may alternatively be a chute end, not shown) has tube brackets 1575 disposed along flexible portion 1540 and embedding portion 1580 to provide for holding a tube (not shown) along the upper body of firmer 1500 to dispensing passage 1585 and spray nozzle 1590. Extender 1510, in this embodiment, may be attached to embedding portion 1580 via a tongue and groove connection, and is substantially thicker than those of the previous embodiments. This arrangement maximizes the size of replaceable extender 1510. Because of the greater size of extender 1510, the size of embedding portion 1580 is reduced. Thus, a pipe may not be feasible within embedding portion 1580, rather provision is made for attachment to flexible tube 1520. Flexible tube 1520 may be connected to a liquid delivery system (not shown) for dispensing water, nutrients, pesticides, and/or herbicides.

Seed firmers such as those described above as well as other types of firmers must be mounted to a plater properly to be effective. A firmer should be attached in a position on the plater so that the embedding portion may contact the seed after it has been deposited in the furrow but before the furrow is closed. The firmer is typically also mounted in such a way that it is able to move and flex freely without interfering with the existing planter equipment. Many modern planters include a variety of devices such disks, wheels, knives, and the like fur opening, closing, and conditioning the soil as well as one or more tubes or chutes for delivering seeds as well as fertilizers, soil amendments, and treatments such as fungicides, pesticides, herbicides, and the like. Typically there is very little room on a modern planter for attaching a firmer mounting bracket so that it can he effective and not interfere with the operation of the planter and/or without making modifications to the placement and operation of the planter's existing attachments.

Firmer mounting bracket 1600 according to One embodiment of the present invention is shown in FIGS. 16-19. In this particular example, mounting bracket 1600 includes mounting portion 1630 for securing the bracket to the planter and firmer attachment housing 1610 far removably securing firmer 1620 to bracket 1600. Mounting portion 1630 is bolted to planter tool arm 1670 such that mounting bracket 1600 is disposed between opening disks 1640 of the planter which allows firmer 1620 to contact the ground aft of seed tube 1770. In this particular example, mounting bracket 1600 is secured to planter tool arm 1670 using existing bolts 1660 which are already a part of the planter. Bolt 1660 passes through mounting arm 1680 portion of mounting portion 1630. Mounting bracket 1600 in this example is installed without having to modify the planter or use additional hardware. In other examples, mounting points may be drilled or other otherwise machined into the planter tool arm and the mounting bracket secured to the planter using bolts or other fasteners not original to the planter. In still other examples, existing mounting points may be used in combination with aftermarket bolts, washers, bushings, or other fasteners adapted for use with the mounting brackets of the present invention.

As shown in FIG. 17, in this example, positioning of mounting bracket 1600 between opening disks 1640 of the planter allows firmer 1520 to be disposed aft of seed tube 1770 which is typically disposed somewhere between the opening disks. Contacting portion 1690 of firmer 1620 may then press the seeds into the furrow before closing wheels 1700 cover the furrow with soil. Optionally, firmer 1620 may be equipped with one or more tubes or channels for delivering fertilizers or other amendments or substances to the furrow before closing by closing wheels 1700. The exact positioning of firmer 1620 relative to opening disks 1640 and closing wheels 1700 may vary according to the particular planter and/or firmer being used.

The cover of firmer attachment housing 1610 has been removed in FIGS. 18-19 so the interior may be visible. The cover is secured to housing 1610 at one or more attachment points 1710 using screws, bolts, or other suitable fasteners. Optionally pins or other protrusions may be used to help insure the housing cover is correctly aligned with the housing when securing it. Housing 1610 includes at least one receiving chamber 1720 having opening 1730 for receiving and securing mounting end 1740 of the firmer. Housing 1610 may include additional openings 1750 as desired, such as to allow passage of fertilizer tube 1760 through housing 1610.

Firmer 1620 is engaged with mounting bracket housing 1610 by sliding mounting end 1740 of firmer 1620 into housing opening 1730 until catch 1780 on the firmer snaps into receiving slot 1790 in the housing. Once catch 1780 and slot 1790 are engaged with one another firmer 1620 is prevented horn backing out of housing 1610. To remove the firmer, a flat bladed tool such as a screwdriver or similar tool is inserted into housing opening 1730 between housing 1610 and firmer 1620 on the same side of the firmer as catch 1780. Pressure is then applied to the tool to urge firmer 1620 away from housing 1610 which flexes firmer 1620 and causes catch 1780 to disengage slot 1790 thereby allowing firmer 1620 to be withdrawn from housing 1610. A worn or broken firmer may then be replaced by a new firmer.

When in use, the size and configuration of housing 1610 and chamber 1720 allows firmer 1620 to flex to the degree necessary for effective performance. Because firmer 1620 is not fixed to housing 1610 in this particular example, firmer 1620 is free to flex along the entire length of firmer 1620 including portion 1740 inserted into mounting bracket 1600. The exact amount of flexure required may vary according to a number of factors including soil composition, weather conditions, the type and variety of seeds being planted, and the like. The degree, of flexure may be adjustable using an optional adjustment screw or bolt. Optional adjustment screw 1650 may be inserted into housing 1610 until the end of screw 1800 is the desired distance away from firmer 1620. As the firmer flexes during use, the firmer contacts the screw which prevents flexure beyond a predetermined range. In other examples, firmer 1620 nay include protrusion 1810 which prevents flexure of the firmer beyond a predetermined degree by contacting wall 1820 of the housing. Such protrusion 1810 may be sized and/or positioned so as to allow as much or as little flexure as desired.

Another example of mounting bracket 2000 according to one embodiment of the present invention is shown in FIGS. 20-24. in this particular example, mourning bracket 2000 includes mounting portion 2010 for securing the bracket to the planter and firmer attachment portion 2020 for removably securing a firmer to the bracket. Mounting portion 2010 is bolted to planter tool arm 2030 such that mounting bracket 2000 is disposed between the opening disks (removed for the sake of clarity) of the planter which allows firmer 2040 to contact the ground aft of seed tube 2050. In this particular example, mounting bracket 2000 is secured to planter tool arm 2030 using bolts. Two bolts 2060 pass through mounting portion 2010. Mounting bracket 2000 in this example is installed by modifying the planter by drilling, two holes for mounting bolts 2060. In other examples, existing mounting points and bolts or fasteners may be used. In still other examples, existing, mounting points may be used in combination with aftermarket bolts, washers, bushings, or other fasteners adapted for use with the mounting brackets of the present invention.

Mounting bracket 2000 in the present example is positioned such that contacting portion 2080 of firmer 2040 may press seeds into a furrow prior to closing wheels 2070 closing the furrow and a firming or pressing wheel (not shown) firming the closed furrow. Optionally, firmer 2040 may he equipped with one or more tubes or channels for delivering fertilizers or other amendments or substances to the furrow before closing by closing wheels 2070. The exact positioning of limier 2040 relative to the opening disks and closing wheels 2070 may vary according to the particular planter and/or firmer being used.

In this particular example, mounting bracket 2000 does not include a bracket housing cover. Rather, firmer 2040 is secured to firmer attachment portion 2020 of bracket 2000 using screws, bolts, pins, straps, or other suitable means that serve as a housing. The exact nature of the attachment mechanism varies according to the make, model, and/or style of firmer being used. In this particular example, firmer 2040 is secured to firmer attachment portion 2020 of the mounting bracket using strap 2090, which in one embodiment includes a barrel hand clamp. The general nature of firmer attachment portion 2020 in this example, having a generally smooth planar surface complementary to the surface of the firmer, allows a wide variety of makes and models of firmers to be used with bracket 2000. Positioning of firmer 2040 relative to mounting bracket 2000 is optionally insured by matching protrusion 2100 on the firmer with a corresponding notch 2110 in firmer attachment portion 2020 as a receiving chamber. In other examples, the protrusion and notch may be of different size, shape, number, and/or configuration. In other examples, the firmer has one of more notches and firmer attachment portion 2020 has one or more protrusions which combined serve as a receiving chamber. In still other examples, each of the firmer and bracket has a mix of protrusions and notches. Firmer 2040 in this example includes mounting portion 2120 attached to flexible arm portion 2130. The degree of flexure allowed by flexible arm portion 2130 is adjustable using screw 2140. Flexure of arm 2130 is prevented beyond a desired set point by screw 2140 contacting mounting portion 2120 firmer 2040. By adjusting the length of screw 2140 protruding through flexible arm portion 2130, the degree of flexure of firmer 2040 may be increased or decreased as desired.

Another example of an improved mounting bracket 2200 is shown in FIGS. 25-28. In this particular example, mourning bracket 2200 is designed to be mounted to tool arm 2210 of the planter on the closing wheel assembly rather than on or near the opening wheel assembly of the previous examples. Mounting bracket 2200 comprises generally L-shaped member 2220 which is mounted to the closing wheel assembly such that the bracket projects forward of the closing wheels so as to position the firmer aft of the opening wheels but forward of closing wheels 2230. Optionally, generally L-shaped bracket 2220 may be comprised of two or more portions bolted, screwed, or otherwise adjustably secured to one another. In this particular example, generally L-shaped bracket 2220 includes generally vertical bracket member 2240 secured using two bolts 2250. The exact position of vertical bracket 2240 may be adjusted relative to the ground so as to adjust the depth to which firmer 2260 extends into a furrow. Once the desired firmer 2260 positioning is achieved, bolts 2250 may be tightened. Optionally, vertical bracket member 2240 and generally L-shaped member 2220 include multiple holes 2270 so a variety of positions may be achieved. L-shaped member 2220 may optionally include cross member 2280 to increase the strength and stability of bracket 2200.

Mounting bracket 2200 is secured to planter tool arm 2210 using pre-existing bolt 2290 on an attachment point non the planter. Existing bolt 2290 is removed, the bracket positioned, and the bolt inserted through the bracket and tightened to the original planter specifications. Optionally, additional hardware such as washers, bushings, longer bolts, and the like may be used. In still other examples a new mounting point may be machined in the planter and new fasteners used where no suitable fasteners or attachment points exist.

Optionally firmer 2260 and/or bracket 2200 may include slot 2320 allowing for finer adjustment to the firmer depth. In this particular example, finer adjustment of firmer 2260 depth is achieved by loosening bolt 2310 which secures firmer 2260 to bracket 2200, adjusting the positioning of firmer 2260 by sliding it up or down relative to bracket 2200, then tightening bolt 2310. Optionally, slot 2300 is machined into the generally vertical member 2240 sized and configured so that mounting portion 2340 of firmer 2260 may slide therein. Seating of firmer mounting portion 2340 in slot 2310 helps prevent twisting of firmer 2260 during use.

In other examples, a generally L-shaped bracket designed for mounting to the closing wheel portion of the planter tool arm such as is shown in FIGS. 25-28 may be used in conjunction with firmer mounting systems such as the housing shown in FIGS. 16-19 or the system shown in FIGS. 20-24. In other examples, the firmer mounting system shown in FIGS. 25-28 may be used in conjunction with a bracket that is mounted to the opening wheel portion of the planter tool arm.

A variety of factors may determine the optimal positioning of coulters during planting so as to achieve the desired seed positioning. Soil type (sandy, loamy, clay, etc.), soil moisture content, field litter (such as plant material from previous crops), and ground speed may all affect the quality of the furrow being opened by the coulters. If the coulters are fixed in position relative to one another then the operator must adjust other variables (such as ground speed during planting) or perform additional work to improve conditions (such as additional passes with implements w break up field litter or hard soil). Allowing the position of the coulters relative to one another to be adjusted allows the operator to achieve better furrow production and seed placement under a wider variety of field conditions.

While this Invention has been described as having an exemplary design, the present invention may he further modified within the sprit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A bracket for attaching to a planter a seed firmer having a flexible arm portion and a firming portion for embedding seeds into soil, comprising:
   a mounting portion adapted to mount the bracket to an existing attachment point on a planter tool arm; and
   a housing portion adapted to receive the flexible portion of a seed firmer, the housing portion comprising an opening for receiving the flexible portion of the seed firmer and a slot for receiving a protrusion on the flexible portion of the seed firmer;
   wherein the firmer is secured to the bracket when the firmer protrusion is engaged with the housing slot;
   wherein the mounting portion is positioned on the planter tool arm such that the firming portion of the firmer is disposed aft of the planter seed chute and forward of the planter closing wheels.

2. The bracket of claim 1, wherein the firmer may be flexed to disengage the firmer protrusion from the housing slot allowing the firmer to be removed from the bracket.

3. The bracket of claim wherein the mounting portion is bolted to a planter tool arm using an existing bolt on the planter.

4. The bracket of claim 1, wherein the housing portion further includes an adjustment screw inserted therethrough which limits flexure of the flexible aim portion of the seed firmer.

5. The bracket of claim 1, wherein the housing portion further includes an opening allowing a liquid-carrying tube to pass therethrough from the planter to the firmer.

6. The bracket of claim 1, wherein the housing portion comprises two separable portions secured together with at least one fastener.

7. A bracket for mounting a seed firmer for embedding seeds into soil to a planter, said bracket comprising:
   a mounting portion adapted to be mounted to an attachment point on a planter;
   a receiving portion for receiving a flexible portion of the firmer adapted to be attached to the bracket, wherein the receiving portion comprises a housing having a hollow chamber adapted to receive the flexible portion of the firmer;

wherein the flexible portion of the firmer includes a protrusion adapted to it into a notch in the housing to secure the firmer to the housing.

8. The bracket of claim 7, wherein flexing the firmer disengages the firmer protrusion from the housing notch and allows the firmer to he removed from the bracket.

9. The bracket of claim 7, wherein the mounting portion is connected to the planter using an existing bolt on he planter.

10. The bracket of claim 7, wherein the receiving portion further includes an adjustment screw inserted therethrough which limits flexure of the flexible arm portion the seed firmer.

11. The bracket of claim 7, wherein the receiving portion further includes an opening allowing a liquid-carrying tube to pass therethrough from the planter to the firmer.

12. The bracket of claim 7, wherein the receiving portion comprises two separable portions secured together with at least one fastener.

13. A bracket assembly for attaching to a planter a seed firmer having a flexible arm portion and a firming portion for embedding seeds into soil, comprising:

a clamp;

a mounting portion adapted to mount the bracket to an existing attachment point on a planter tool arm; and a clamp receiving portion adapted to receive the flexible portion of a seed firmer and a clamp, the clamp receiving portion comprising an opening for receiving the flexible portion of the seed firmer and a slot for receiving a protrusion on the flexible portion of the seed firmer;

wherein the firmer is secured to the bracket when the clamp secures the flexible portion of the firmer to the clamp receiving portion and the protrusion is engaged with the clamp receiving slot;

wherein the mounting portion is positioned on the planter tool arm such that the firming portion of the firmer is disposed aft of the planter seed chute and forward of the planter dosing wheels.

14. The bracket assembly of claim 13, wherein the mounting portion is bolted to a planter tool arm using an existing bolt on the planter.

15. The bracket assembly of claim 13, wherein the assembly further includes an adjustment screw which limits flexure of the flexible an portion of the seed firmer.

16. The bracket assembly of claim 13, wherein the mounting portion and the clamp receiving portion form a generally L-shaped bracket.

* * * * *

UNITED STATES PATENT AND TRADEMARK OFFICE
CERTIFICATE OF CORRECTION

PATENT NO.         : 10,201,123 B2
APPLICATION NO.    : 15/405923
DATED              : February 12, 2019
INVENTOR(S)        : Jeffrey J. Peter Page 1 of 1

It is certified that error appears in the above-identified patent and that said Letters Patent is hereby corrected as shown below:

In the Claims

Column 12, Line 54, Claim 4 please delete the word "aim" and insert the word --arm--.

Column 13, Line 5, Claim 7 please delete the word "it" and insert the word --fit--.

Column 13, Line 9, Claim 8 please delete the word "he" and insert the word --be--.

Column 13, Line 11, Claim 9 please delete the word "he" and insert the word --the--.

Column 13, Line 14, Claim 10 please insert the word --of-- between the words "portion" and "the".

Signed and Sealed this
Nineteenth Day of March, 2019

Andrei Iancu
*Director of the United States Patent and Trademark Office*